United States Patent
Song et al.

(10) Patent No.: US 9,596,665 B2
(45) Date of Patent: *Mar. 14, 2017

(54) METHOD AND APPARATUS FOR PROVIDING CHANNEL INFORMATION IN A WIRELESS NETWORK

(71) Applicant: LG ELECTRONICS INC., Seoul (KR)

(72) Inventors: Jaehyung Song, Seoul (KR); Hangseok Oh, Seoul (KR); Kyoungsuk Ko, Seoul (KR); Kyungchul Kwak, Seoul (KR); Inhwan Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/074,735

(22) Filed: Mar. 18, 2016

(65) Prior Publication Data

US 2016/0205639 A1 Jul. 14, 2016

Related U.S. Application Data

(63) Continuation of application No. 14/603,618, filed on Jan. 23, 2015, now Pat. No. 9,326,256, which is a
(Continued)

(51) Int. Cl.
| | |
|---|---|
| *H04L 12/28* | (2006.01) |
| *H04W 4/00* | (2009.01) |
| *H04W 52/54* | (2009.01) |
| *H04W 52/30* | (2009.01) |
| *H04W 16/14* | (2009.01) |

(Continued)

(52) U.S. Cl.
CPC ............ *H04W 52/54* (2013.01); *H04N 21/00* (2013.01); *H04W 16/14* (2013.01); *H04W 52/30* (2013.01); *H04W 52/367* (2013.01); *H04W 72/0453* (2013.01); *H04W 72/0473* (2013.01); *H04W 84/12* (2013.01); *H04W 88/08* (2013.01)

(58) Field of Classification Search
CPC ..................................................... H04W 84/12
See application file for complete search history.

(56) References Cited

U.S. PATENT DOCUMENTS

| 7,974,299 B1 | 7/2011 | Banerjea et al. | |
| 8,514,799 B2 * | 8/2013 | Kim .................. | H04W 72/0406 370/329 |

(Continued)

FOREIGN PATENT DOCUMENTS

KR  10-2010-0015885 A  2/2010

*Primary Examiner* — Kevin C Harper
(74) *Attorney, Agent, or Firm* — Dentons US LLP

(57) ABSTRACT

A method for transmitting and receiving, by a station, channel information in a wireless LAN system, the method comprising:
receiving a beacon frame including the channel information, wherein the channel information includes information for a channel change, the information for the channel change includes a field for a operating class of a new channel, a field for a channel number of the new channel and a field for a maximum transmit power of the new channel; parsing the beacon frame; and changing to a new channel with the maximum transmit power.

5 Claims, 22 Drawing Sheets

Related U.S. Application Data continuation of application No. 13/703,825, filed as application No. PCT/KR2011/004496 on Jun. 20, 2011, now Pat. No. 9,014,164.

(60) Provisional application No. 61/361,436, filed on Jul. 5, 2010, provisional application No. 61/358,933, filed on Jun. 27, 2010, provisional application No. 61/356,645, filed on Jun. 20, 2010.

(51) Int. Cl.
  *H04W 72/04* (2009.01)
  *H04N 21/00* (2011.01)
  *H04W 52/36* (2009.01)
  *H04W 84/12* (2009.01)
  *H04W 88/08* (2009.01)

(56) References Cited

U.S. PATENT DOCUMENTS

| | | |
|---|---|---|
| 8,588,146 B2 | 11/2013 | Gossain et al. |
| 9,014,164 B2* | 4/2015 | Song .................... H04W 16/14 370/343 |
| 9,326,256 B2* | 4/2016 | Song .................... H04W 16/14 |
| 2003/0133460 A1 | 7/2003 | Lee et al. |
| 2004/0156382 A1 | 8/2004 | Jang |
| 2006/0280131 A1 | 12/2006 | Rahman et al. |
| 2009/0207800 A1 | 8/2009 | Shan et al. |
| 2009/0323835 A1 | 12/2009 | Rao et al. |
| 2010/0085921 A1 | 4/2010 | Wu et al. |
| 2010/0330919 A1 | 12/2010 | Gurney et al. |
| 2012/0076117 A1 | 3/2012 | Montemurro |
| 2013/0090071 A1 | 4/2013 | Abraham |
| 2013/0205313 A1* | 8/2013 | Kim ....................... H04N 21/24 725/14 |
| 2013/0235861 A1 | 9/2013 | Balasubramanian et al. |

* cited by examiner

FIG.2
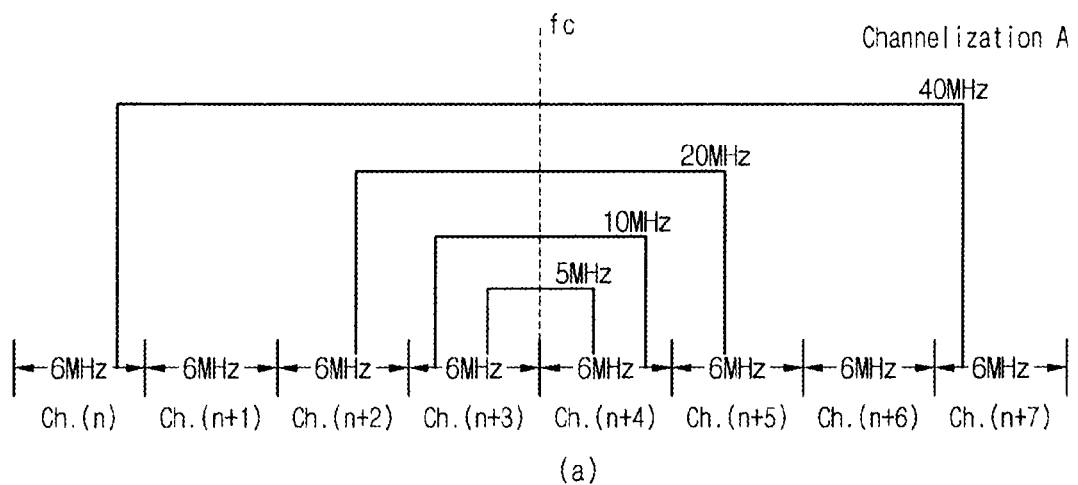
(a)
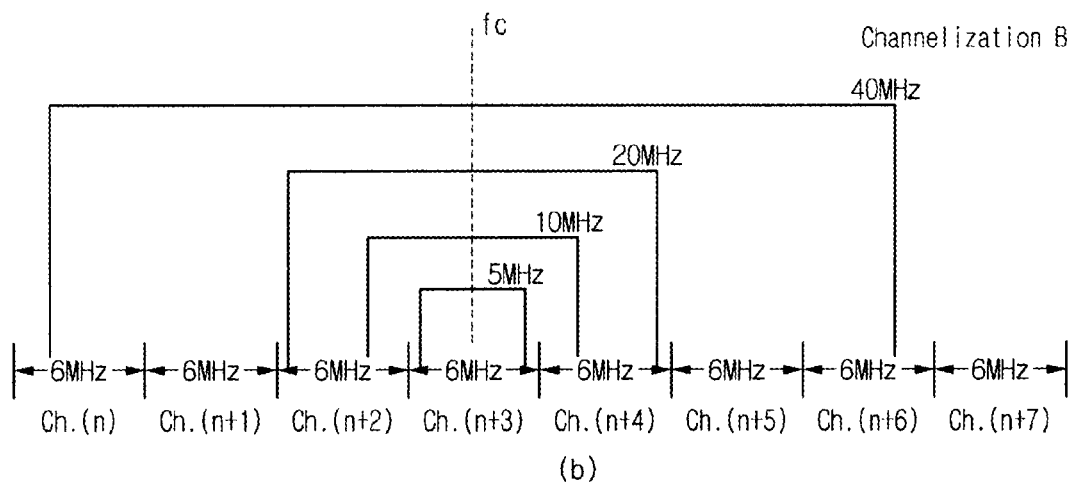
(b)

FIG.4
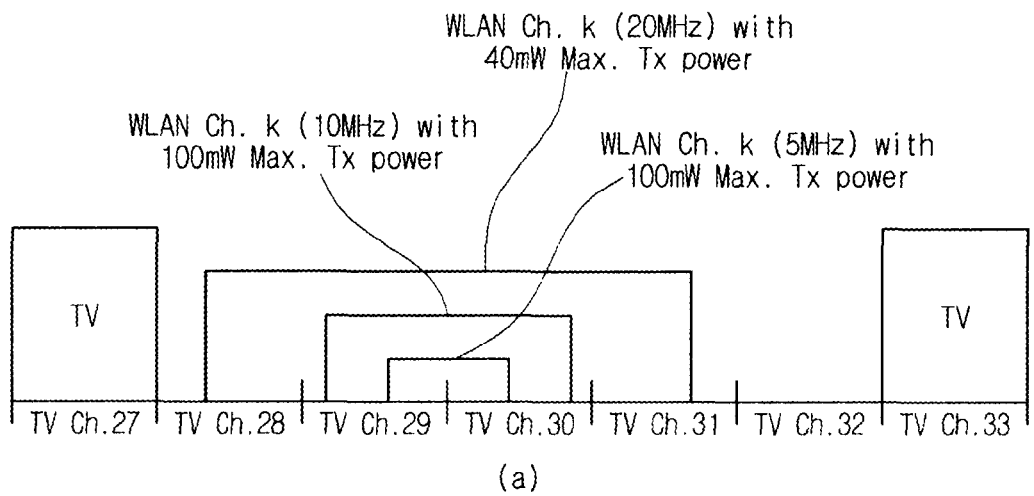
(a)
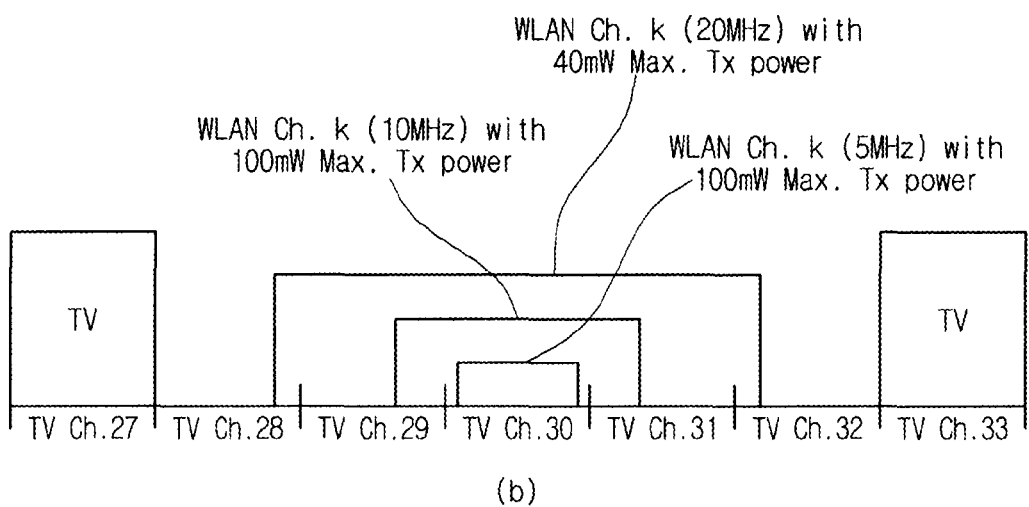
(b)

| Octets: | 1 | 1 | Variable |
|---|---|---|---|
| | Info ID (610) | Length (620) | Channel Power Management Announcement (630) | ized.

METHOD AND APPARATUS FOR PROVIDING CHANNEL INFORMATION IN A WIRELESS NETWORK

This application is a continuation of U.S. application Ser. No. 14/603,618, filed on Jan. 23, 2015, which is a continuation of U.S. application Ser. No. 13/703,825, filed Dec. 12, 2012 (now issued as U.S. Pat. No. 9,014,164), which claims the priority to and benefit of PCT/KR2011/004496 filed on Jun. 20, 2011 and U.S. Provisional Application No. 61/356,645 filed on Jun. 20, 2010, 61/358,933 filed on Jun. 27, 2010 and 61/361,436 filed on Jul. 5, 2010, all of which are incorporated by reference in their entirety herein.

BACKGROUND

The present disclosure relates to a wireless LAN system using TV white space, and more particularly, to a device and method for identifying channel information in a wireless network.

A television broadcast service is currently shifting from analog to digital broadcasting, since the digital broadcasting can provide high quality images and interactive services and enable more efficient use of spectrums.

The shifting to digital broadcasting allows a part of a very high frequency (VHF, 54 MHz to 88 MHz) band and ultra high frequency (UHF, 174 MHz to 698 MHz) band, allocated for typical analog broadcasting, to be used by anybody. One of examples of such an available frequency band is TV white space (hereinafter, referred to as 'TVWS').

That is, the TVWS means a VHF or UHF frequency band which is allocated for TV broadcasting but is not used by a broadcast provider. Thus, the TVWS is an unlicensed frequency band which can be used by anybody when radio regulations of the government are satisfied. When a licensed device is not used in the unlicensed frequency band, an unlicensed device may use the frequency band. Here, the licensed device means a user permitted to use the TVWS, and may be called a primary user (or TV signal) or incumbent user.

The Federal Communications Commission (FCC) of the United States allowed a VHF frequency band and UHF frequency band used for a DTV to be used by anybody satisfying the regulations provided by the FCC.

For example, as illustrated in FIG. 1, the FCC is preparing a regulation for allowing unlicensed devices to use TV channels other than channel 37 (reserved for radio astronomy) when signals such as TV signals and wireless microphone signals of licensed devices do not exist in the TV channels. By applying such a regulation of the FCC with modifications, other countries are preparing policies and regulations with respect to the TVWS.

Further, various wireless communication systems for using the TVWS is being developed. For example, the Institute of Electrical and Electronics Engineers (IEEE) 802.11 working group is developing a wireless local area network (WLAN) system using the TVWS with the 802.11af standard.

SUMMARY

Embodiments provide an information element and a public action frame for enabling wireless LAN devices operating in TVWS to identify channel information.

Embodiments also provide a method and device for enabling wireless LAN devices operating in TVWS to identify a power change of an operating channel.

Embodiments also provide a method and device for enabling wireless LAN devices operating in TVWS to identify information on a channel to move to.

Embodiments also provide a method and device for enabling wireless LAN devices operating in TVWS to perform a deenablement operation to a specific channel.

In one embodiment, A method for transmitting and receiving, by a station, channel information in a wireless LAN system, the method comprising: receiving a beacon frame including the channel information, wherein the channel information includes information for a channel change, the information for the channel change includes a field for a operating class of a new channel, a field for a channel number of the new channel and a field for a maximum transmit power of the new channel; parsing the beacon frame; and changing to a new channel with the maximum transmit power.

In another embodiment, A device for transmitting and receiving, by a station, channel information in a wireless LAN system, the device comprising: an RF transmitting/receiving unit configured to receive a beacon frame including the channel information, wherein the channel information includes information for a channel change, the information for the channel change includes a field for a operating class of a new channel, a field for a channel number of the new channel and a field for a maximum transmit power of the new channel; and a control unit configured to parse the beacon frame and change to a new channel with the maximum transmit power.

According to an embodiment, wireless LAN devices operating in the TVWS are enabled to identify available maximum transmit power according to whether a TV broadcasting service exists in an adjacent channel, and thus communication can be performed without interference on the TV broadcasting service existing in the adjacent channel.

According to another embodiment, an enabling STA operating in the TVWS can perform deenablement to a dependent STA operating in a specific channel.

Other various effects will be explicitly or implicitly disclosed in the following detailed description.

BRIEF DESCRIPTION OF THE DRAWINGS

FIG. 2 illustrates two methods for defining a channel in a wireless LAN system using the TVWS.

FIG. 4 illustrates a TV signal of an adjacent channel, which exists or not according to a channel defining method of the wireless LAN system, and maximum transmit power depending on whether the TV signal exists or not.

FIG. 6 illustrates a structure of a registered location query protocol element according to the first embodiment.

DETAILED DESCRIPTION OF THE EMBODIMENTS

Detailed descriptions of well-known functions or configurations will be omitted in order not to unnecessarily obscure the focus of the present invention. The terms used herein are defined in consideration of functions of the present invention, but may be differently defined according to intention of a user or operator. Thus, the definitions should be determined based on the overall content of the present disclosure.

A wireless LAN system performs communication by using a channel bandwidth of 5 MHz, 10 MHz, 20 MHz, or 40 MHz in a 2.4 GHz or 5 GHz band. On the contrary, channel bandwidths of TV white space (TVWS) are different according to regions and/or nations, and thus 6 MHz, 7 MHz, or 8 MHz may be used depending on regions. Since a channel allocation unit of the wireless LAN system is different from that of the TVWS, it is needed to define a corresponding channel according to the channel bandwidth of the TVWS for the wireless LAN system using the TVWS.

For example, FIG. 2 illustrates two methods for defining a corresponding channel (5 MHz, 10 MHz, 20 MHz, or 40 MHz) of the wireless LAN system in a TVWS band where a channel is allocated in a unit of 6 MHz.

Referring to FIG. 2(A), according to a first channel defining method (Channelization A), for each channel (5/10/20/40 MHz) of the wireless LAN system, a center frequency of a corresponding channel is located at a center frequency of a TV channel (6 MHz).

Referring to FIG. 2(B), according to a second channel defining method (Channelization B), for each channel (5/10/20/40 MHz) of the wireless LAN system, a center frequency of a corresponding channel is located at a boundary between contiguous two TV channel bands.

The wireless LAN system using the TVWS may perform communication by using one of the above-described two channel defining methods.

According to the regulations of the Federal Communications Commission (FCC) of the United States, when a TV signal (or TV broadcast) does not exist in a channel adjacent to an operating channel in a wireless network using the TVWS, wireless LAN devices belonging to a corresponding network may operate with maximum transmit power of 100 mW. On the contrary, when a TV signal exists in the adjacent channel, the wireless LAN devices belonging to a corresponding network may operate with maximum transmit power of 40 mW.

That is, when a primary user exists in the adjacent channel, maximum transmit power of the wireless LAN devices is limited in order to prevent inference on the primary user.

Figure 1:
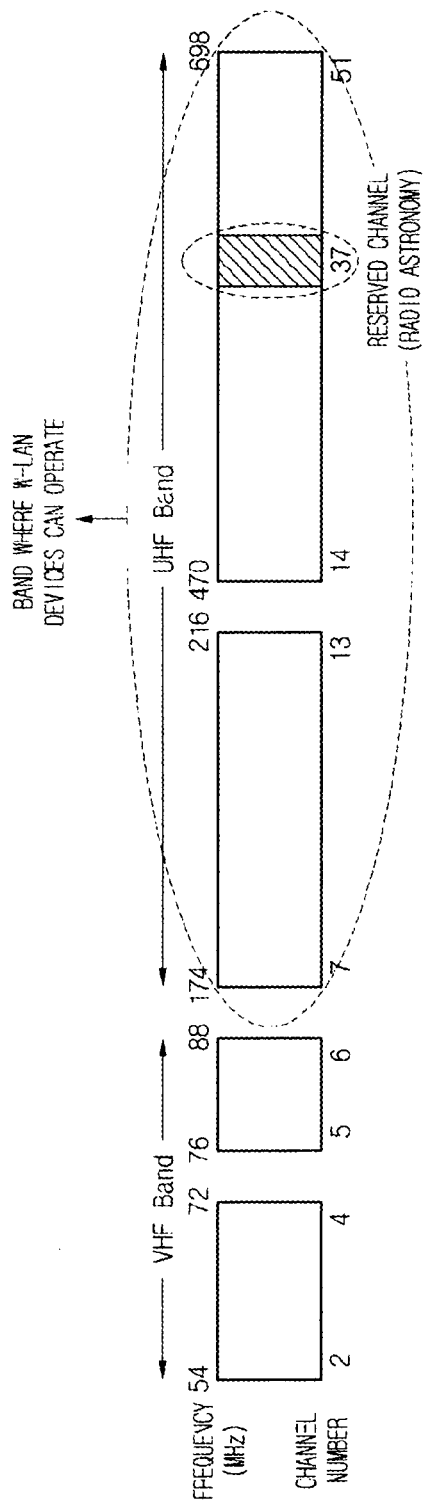
FIG. 1 illustrates a channel map showing a TV band of the US and a band where W-LAN devices can operate.
Figure 3:
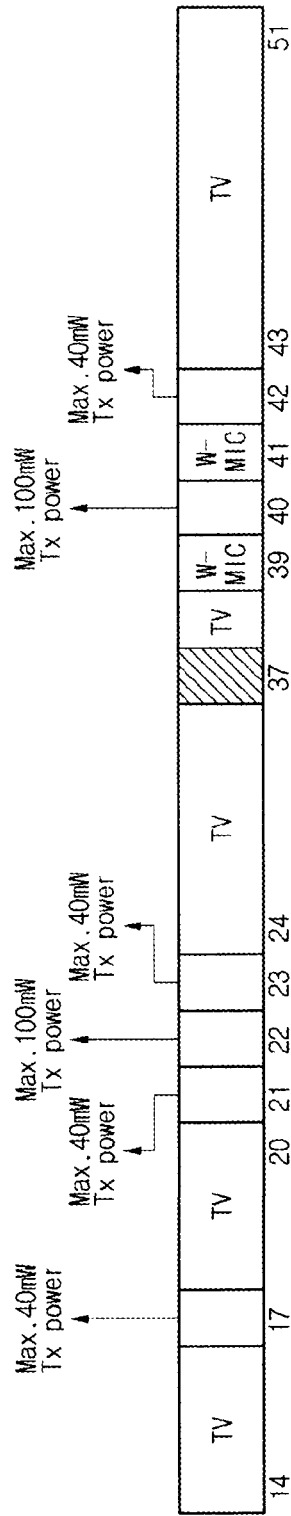
FIG. 3 illustrates an example of maximum transmit power limited according to whether a primary user exists in an adjacent channel in the TVWS and to a type of the primary user.

For example, FIG. 3 illustrates an example of maximum transmit power limited according to whether a primary user exists in an adjacent channel in the TVWS and to a type of the primary user.

Referring to FIG. 3, when an operating channel is channel 22, since a primary user does not exist in channels 21 and 23 adjacent to the channel 22, the wireless LAN devices operating in the channel 22 may transmit signals with maximum transmit power of 100 mW.

When the operating channel is the channel 21 or 23, since a primary user, i.e. a "TV signal", exists in an adjacent channel to the operating channel, maximum transmit power of the wireless LAN devices operating in the channel 21 or 23 is limited to 40 mW.

When the operating channel is channel 40, a primary user exists in channels 39 and 41 adjacent to the operating channel. However, when a type of the primary user is not a "TV signal" but a "wireless microphone (W-MIX) signal", the wireless LAN devices may transmit signals with maximum transmit power of not 40 mW but 100 mW.

In FIG. 3, the wireless microphone signal is allocated to the channels 39 and 41 but is not limited thereto. That is, according to changes in the regulations of the FCC, the wireless microphone signal may be allocated to other channels.

In addition, although it is exemplified that the wireless LAN devices operate with maximum transmit power of 100 mW or 40 mW according to whether a TV signal exists in an adjacent channel, the numerical values may also be changed according to the changes in the regulations of the FCC.

FIG. 4 illustrates a TV signal of an adjacent channel, which exists or not according to channel definitions of the wireless LAN system, and maximum transmit power depending on whether the TV signal exists or not. In FIG. 4(A), the wireless LAN system defines a corresponding channel by using the first channel defining method of FIG. 2. In FIG. 4(B), the wireless LAN system defines a corresponding channel by using the second defining method of FIG. 2.

Referring to FIGS. 4(A) and 4(B), TV signals exist in channels 27 and 33, and channels 28 to 32 are empty. In this state, the wireless LAN system needs to define a channel of 5 MHz, 10 MHz, 20 MHz, or 40 MHz in order to use empty TVWS channels.

Firstly, when the wireless LAN system defines a channel of 5 MHz or 10 MHz, it may be confirmed that a TV signal does not exist in an adjacent channel to the defined channel regardless of the above-described channel defining methods. Therefore, the wireless LAN system operating in a kth channel by using the channel bandwidth of 5 MHz or 10 MHz may transmit signals with maximum transmit power of 100 mW.

When the wireless LAN system defines a channel of 20 MHz, it may be confirmed that a TV signal exists in an adjacent channel to the defined channel regardless of the above-described channel defining methods. Therefore, the maximum transmit power of the wireless LAN system operating in the kth channel by using the channel bandwidth of 20 MHz is limited to 40 mW.

That is, as illustrated in FIG. 4, even though a channel of the wireless LAN system shares a TVWS band, a TV signal may exist or may not exist in an adjacent channel according to a bandwidth of the channel of the wireless LAN system. Further, according to whether the TV signal exists in the adjacent channel, the maximum transmit power of the channel of the wireless LAN system is changed.

Therefore, the wireless LAN device operating in the TVWS should recognize the maximum transmit power of a channel where the device is operating or a channel to which the device desires to move. While the wireless LAN device operates in the TVWS, if a fact on whether the TV signal exists in the adjacent channel is changed, it is needed to change the maximum transmit power.

However, the IEEE 802.11af standard does not provide a method for enabling the wireless LAN device to identify the maximum transmit power of a corresponding channel.

Therefore, a first embodiment provides an information element and a frame for enabling the wireless LAN devices operating in the TVWS to identify channel information of a corresponding channel.

Further, the first embodiment provides a method for enabling the wireless LAN devices to identify information on maximum transmit power of an operating channel or a channel to move to by using the information element or frame.

First Embodiment

Hereinafter, the first embodiment will be described in detail with reference to the accompanying drawings.

Figure 5:
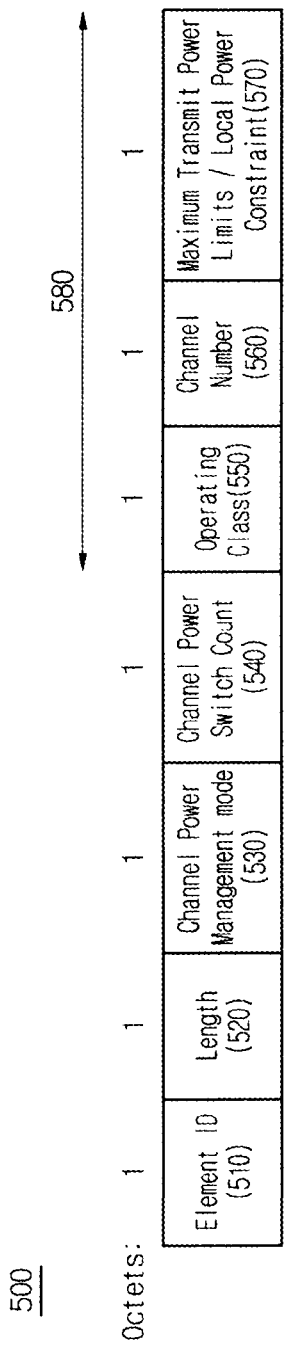
FIG. 5 illustrates a structure of a channel power management announcement element according to a first embodiment.

FIG. 5 illustrates a channel power management announcement element 500 for announcing channel information. Here, the channel power management announcement element 500 may be referred to as a channel power switch announcement element.

The information element 500 may be used for signaling channel information that is dynamically changed. For example, when information on an available channel list is changed in a wireless network, the information element 500 may be used for announcing the changed available channel list information.

Further, when an operating channel in the wireless network is changed from a current channel to a new channel or the maximum transmit power defined for a currently operating channel is changed, the information element 500 may be used for signaling the changed channel information.

The information element 500 may be included in a beacon frame, a probe response frame, an association response frame, or a reassociation response frame in order to be transmitted.

Here, the beacon frame is a signal periodically transmitted by an access point (hereinafter, referred to as an AP) in order to transmit system information and/or state information of the wireless network to stations that belong thereto.

The probe response frame is a signal transmitted by the AP in response to a probe request frame that is transmitted from a station belonging to the wireless network to request information on the network.

The association response frame or reassociation response frame is a signal transmitted by the AP in response to an association request frame or reassociation request frame that is transmitted from a station belonging to the wireless network to request association to the network.

Management frames such as the beacon frame and probe response frame may announce that an information element about channel power management is included in a frame body.

For example, as shown in Table 1 below, the beacon frame may announce that the information element about the channel power management is included, by using information number 36 of a frame body.

TABLE 1

| Order | Information | Notes |
| --- | --- | --- |
| 36 | Supported Operating Classes | The Supported Operating Classes element is present if dot11ExtendedChannelSwitchActivated or dot11ChannelPowerManagementActivated is true. |

Further, as shown in Table 2 below, the beacon frame may announce that the information element about the channel power management is included, by defining additional order information in a frame body.

TABLE 2

| Order | Information | Notes |
| --- | --- | --- |
| <ANA> | Channel Power Management Announcement | Channel Power Management Announcement element is optionally present if dot11ChannelPowerManagementActivated is true. |

Further, as shown in Table 3 below, the association request frame may announce that the information element about the channel power management is included, by using information numbers 7 and 12 of a frame body.

TABLE 3

| Order | Information | Notes |
| --- | --- | --- |
| 7 | Supported Channels | The Supported Channels element shall be present if dot11SpectrumManagementRequired is true and either dot11ExtendedChannelSwitchActivated is false or dot11ChannelPowerManagementActivated is true. |
| 12 | Supported Operating Classes | The Supported Operating Classes information element is present if dot11ExtendedChannelSwitchEnabled or dot11ChannelPowerManagementActivated is true. |

Further, as shown in Table 4 below, the reassociation request frame may announce that the information element about the channel power management is included, by using information numbers 8 and 15 of a frame body.

TABLE 4

| Order | Information | Notes |
| --- | --- | --- |
| 8 | Supported Channels | The Supported Channels element shall be present if dot11SpectrumManagementRequired is true and either dot11ExtendedChannelSwitchActivated |

TABLE 4-continued

| Order | Information | Notes |
|---|---|---|
| | | is false or dot11ChannelPowerManagement Activated is true. |
| 15 | Supported Operating Classes | The Supported Operating Classes information element is present if dot11ExtendedChannelSwitchActivated or dot11ChannelPowerManagement Activated is true. |

Further, as shown in Table 5 below, the probe request frame may announce that the information element about the channel power management is included, by using information number 6 of a frame body.

TABLE 5

| Order | Information | Notes |
|---|---|---|
| 6 | Supported Operating Classes | The Supported Operating Classes information element is present if dot11ExtendedChannelSwitchActivated or dot11ChannelPowerManagementActivated is true. |

Further, as shown in Table 6 below, the probe response frame may announce that the information element about the channel power management is included, by defining additional order information in a frame body.

TABLE 6

| Order | Information | Notes |
|---|---|---|
| <ANA> | Channel Power Management Announcement | The Channel Power Management Announcement element is optionally present if dot11ChannelPowerManagementActivated is true. |

An AP constituting a basic service set (BSS) and a station constituting an independent basic service set (IBSS) may transmit the beacon frame, probe response frame, or association response frame including the information element 500 to other stations in order to announce changed channel information.

Referring to FIG. 5, the information element 500 includes an element ID field 510, a length field 520, a channel power management mode field 530, a channel power switch count field 540, an operating class field 550, a channel number field 560, and a regulatory maximum transmit power/local power constraint field 570.

The element ID field 510 represents an identifier (ID) of the corresponding information element, and the length field 520 represents a length of the corresponding information element. Here, a value of the length field 520 may be variable, and a minimum value thereof is 3.

The channel power management mode field 530 includes channel information to be announced through the information element 500. That is, the channel power management mode field 530 performs signaling to indicate whether a role of the information element 500 is to change transmit power on an operating channel or to switch between channels.

More specifically, the channel power management mode field 530 indicates whether the information element 500 is used for announcing a change in the available channel list, is used for announcing switching to a new channel and announcing the regulatory maximum transmit power (or local power constraint) in the new channel, or is used for announcing a change in the regulatory maximum transmit power (or local power constraint) in an operating channel without channel switching.

Further, the channel power management mode field 530 indicates whether the information element 500 includes the channel power switch count field 540 or regulatory maximum transmit power/local power constraint field 570.

Further, the channel power management mode field 530 indicates whether the information element 500 includes a triplet consisting of an operating class, a channel number, and regulatory maximum transmit power or a triple consisting of an operating class, a channel power, and local power constraint.

Further, the channel power management mode field 530 indicates several constraints on transmission until channel switching or power switching is completed.

In order to announce the above-described different pieces of channel information, the channel power management mode field 530 defines values as shown in Table 7 below.

TABLE 7

| Channel Power Management Mode Value | Description |
|---|---|
| 0 | A channel power management announcement element does not include a channel power switch count field. The channel power management announcement element includes a triplet consisting of an operating class, a channel number, and regulatory maximum transmit power. The channel power management announcement element is used for announcing addition of new channel(s) to the available channel list. |
| 1 | The channel power management announcement element does not include the channel power switch count field. The channel power management announcement element includes an operating class field and a channel number field, and does not include a regulatory maximum transmit power/local power constraint field. The channel power management announcement element is used for announcing deletion of new channel(s) from the available channel list. |
| 2 | The channel power management announcement element includes the channel power switch count field. The channel power management announcement element includes a triplet consisting of an operating class, a channel number, and regulatory maximum transmit power. The channel power management announcement element is used for announcing a change in regulatory maximum transmit power for a specific channel without channel switching. Transmission interruption is not requested until the changing the regulatory maximum transmit power is completed. |
| 3 | The channel power management announcement element includes the channel power switch count field. The channel power management announcement element includes a triplet consisting of an operating class, a channel number, and regulatory maximum transmit power. The channel power management announcement element is used for announcing a change in regulatory maximum transmit power for a specific channel without channel switching. Transmission interruption is requested until the changing the regulatory maximum transmit power is completed. |
| 4 | The channel power management announcement element includes the channel power switch count field. The channel power management announcement element |

TABLE 7-continued

| Channel Power Management Mode Value | Description |
|---|---|
| | includes a triplet consisting of an operating class, a channel number, and regulatory maximum transmit power. The channel power management announcement element is used for announcing switching to new channel(s) having the regulatory maximum transmit power. Transmission interruption is not requested until the channel switching is completed. |
| 5 | The channel power management announcement element includes the channel power switch count field. The channel power management announcement element includes a triplet consisting of an operating class, a channel number, and regulatory maximum transmit power. The channel power management announcement element is used for announcing switching to new channel(s) having the regulatory maximum transmit power. Transmission interruption is requested until the channel switching is completed. |
| 6 | The channel power management announcement element includes the channel power switch count field. The channel power management announcement element includes a triplet consisting of an operating class, a channel number, and local power constraint. The channel power management announcement element is used for announcing a change in local power constraint for a specific channel without channel switching. Transmission interruption is not requested until the changing the local power constraint is completed. |
| 7 | The channel power management announcement element includes the channel power switch count field. The channel power management announcement element includes a triplet consisting of an operating class, a channel number, and local power constraint. The channel power management announcement element is used for announcing a change in local power constraint for a specific channel without channel switching. Transmission interruption is requested until the changing the local power constraint is completed. |
| 8 | The channel power management announcement element includes the channel power switch count field. The channel power management announcement element includes a triplet consisting of an operating class, a channel number, and local power constraint. The channel power management announcement element is used for announcing switching to new channel(s) having the local power constraint. Transmission interruption is not requested until the channel switching is completed. |
| 9 | The channel power management announcement element includes the channel power switch count field. The channel power management announcement element includes a triplet consisting of an operating class, a channel number, and local power constraint. The channel power management announcement element is used for announcing switching to new channel(s) having the local power constraint. Transmission interruption is requested until the channel switching is completed. |
| 10 | The channel power management announcement element does not include the channel power switch count field. The channel power management announcement element includes a triplet consisting of an operating class, a channel number, and regulatory maximum transmit power. The channel power management announcement element is used for deenabling a specific channel. |
| 11-255 | Reserved |

Referring to Table 7, the channel power management mode field 530 defines 11 (0 to 10) mode values.

When a mode value of the channel power management mode field 530 is '0', the value means that the information element 500 is used for announcing addition of new channel(s) to the available channel list. Here, the information element 500 includes information on an operating class, a channel number, and regulatory maximum transmit power for the newly added channel(s).

When the mode value of the channel power management mode field 530 is '1', the value means that the information element 500 is used for announcing deletion of existing channel(s) from the available channel list. Here, the information element 500 includes information on an operating class and a channel number for the deleted channel(s). In addition, the information element 500 does not include information on regulatory maximum transmit power/local power constraint for the deleted channels.

When the mode value of the channel power management mode field 530 is '2' or '3', the value means that the information element 500 is used for announcing a change in regulatory maximum transmit power in a specific channel without channel switching. Here, the information element 500 includes information on an operating class, a channel number, and regulatory maximum transmit power of the specific channel.

Further, the information element 500 includes information on whether transmission is interrupted until changing the regulatory maximum transmit power is completed. Here, when the mode value is '2', the interruption of data transmission is not requested until the power changing is completed. On the contrary, when the mode value is '3', the interruption of data transmission is requested until the power changing is completed.

When the mode value of the channel power management mode field 530 is '4' or '5', the value means that the information element 500 is used for announcing switching to new channel(s) having the regulatory maximum transmit power. Here, the information element 500 includes information on an operating class, a channel number, and the regulatory maximum transmit power of the new channel(s).

Further, the information element 500 includes information on whether transmission is interrupted until the channel switching is completed. Here, when the mode value is '4', the interruption of data transmission is not requested until the channel switching is completed. On the contrary, when the mode value is '5', the interruption of data transmission is requested until the channel switching is completed.

When the mode value of the channel power management mode field 530 is '6' or '7', the value means that the information element 500 is used for announcing a change in local power constraint in a specific channel without channel switching. Here, the information element 500 includes information on an operating class, a channel number, and the local power constraint of the specific channel.

Further, the information element 500 includes information on whether transmission is interrupted until the changing the local power constraint is completed. Here, when the mode value is '6', the interruption of data transmission is not requested until the power changing is completed. On the contrary, when the mode value is '7', the interruption of data transmission is requested until the power changing is completed.

When the mode value of the channel power management mode field 530 is '8' or '9', the value means that the information element 500 is used for announcing switching to new channel(s) having the local power constraint. Here, the information element 500 includes information on an operating class, a channel number, and the local power constraint of the new channel(s).

Further, the information element 500 includes information on whether transmission is interrupted until the channel switching is completed. Here, when the mode value is '8', the interruption of data transmission is not requested until the channel switching is completed. On the contrary, when the mode value is '9', the interruption of data transmission is requested until the channel switching is completed.

When the mode value of the channel power management mode field 530 is '10', the value means that the information element 500 is used for announcing deenablement of a specific channel. Here, the information element 500 includes information on an operating class, a channel number, and regulatory maximum transmit power of the specific channel. For example, the information element 500 may set the regulatory maximum transmit power to '0'.

Referring to FIG. 5, the channel power switch count field 540 indicates the number of target beacon transmission times (TBTTs) until a station transmitting the information element 500 switches to a new channel, or indicates a zero value.

For example, when a value of the channel power switch count field 540 is set to '1', this value means that channel switching instantly occurs before next TBTT.

When the value of the channel power switch count field 540 is set to '0', this value means that channel switching may occur at any time after a frame including the information element 500 is transmitted. Further, in the case of changing the regulatory maximum transmit power in an operating channel without channel switching, the same zero value may be set.

The operating class field 550 indicates a number of an operating class of a corresponding channel. Here, the operating class represents an index for a set of values for wireless operations in the wireless LAN system. Here, the values for wireless operations include a channel starting frequency, channel spacing, a channel set, and a behavior limit set.

The channel number field 560 indicates a number of a corresponding channel. Here, the number of the corresponding channel is defined in an operating class of a station.

The regulatory maximum transmit power/local power constraint field 570 indicates available transmit power in a specific channel after channel power management (channel or power switching).

The regulatory maximum transmit power 570 represents the maximum transmit power defined by an organization such as the FCC to prevent interference on a primary user (TV signal). For example, according to whether a TV signal exists in an adjacent channel, the regulatory maximum transmit power may define the available maximum transmit power as 100 mW or 40 mW, but is not limited thereto.

The local power constraint field 570 represents that an AP limits transmit power of stations managed thereby in order to prevent interference between stations. That is, the local power constraint does not represent regulatory transmit power constraint, but represents the transmit power constraint determined by the AP. The local power constraint field 570 is not necessarily included in the information element 500 but may be selectively included.

The operating class field 550, the channel number field 560, and the regulatory maximum transmit power/local power constraint field 570 constitute one triplet 680, wherein the triplet 680 may be repeated by as much as the length specified in the length field 520.

FIG. 6 illustrates a registered location query protocol element 600 for announcing channel information.

The information element 600 may be used for signaling channel information that is dynamically changed. In particular, the information element 600 may be used to request channel power management or respond thereto by using the GAS protocol defined in the IEEE 802.11u standard rather than using a designated public action frame.

Referring to FIG. 6, the information element 600 includes an information ID field 610, a length field 620, and a channel power management announcement field 630.

The information ID field 610 indicates that the corresponding information element is related to channel power management.

The length field 620 indicates a length of the channel power management announcement field 630. Here, a value of the length field 620 may be variable, and a minimum value thereof is 3.

The channel power management announcement field 630 indicates information on the channel power management announcement element 500. That is, the channel power management announcement field 630 may have the same configuration as the fields included in the channel power management announcement element 500.

Figure 7:
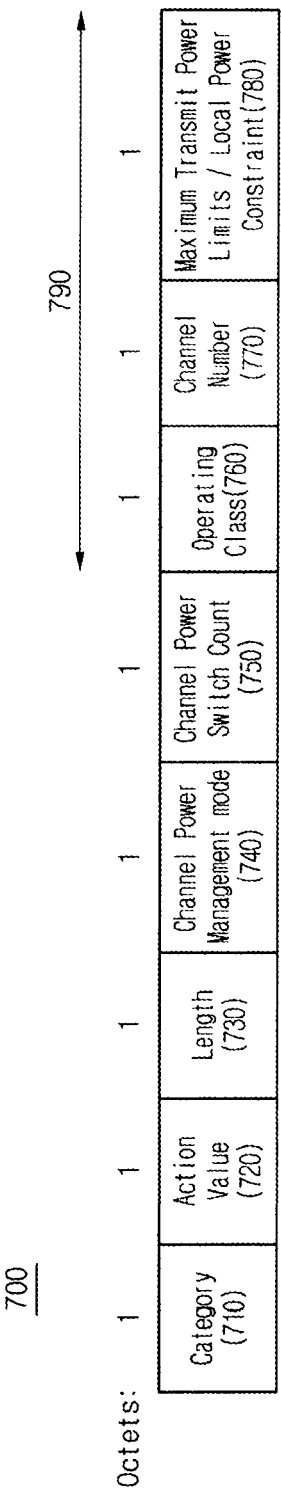
FIG. 7 illustrates a structure of a channel power management announcement frame according to the first embodiment.

FIG. 7 illustrates a channel power management announcement frame 700 for announcing channel information. Here, the channel power management announcement frame may be referred to as a channel power switch announcement frame.

The channel power management announcement frame 700 is a kind of a public action frame. That is, the channel management announcement frame 700 is transmitted as an additional frame, not being included in the beacon frame or probe response frame in order to be transmitted like the above-described channel power management element 500.

The frame 700 may be used for signaling channel information that is dynamically changed. For example, when information on the available channel list is changed in the wireless network, the frame 700 may be used for announcing the changed available channel list information.

Further, when an operating channel in the wireless network is changed from a current channel to a new channel or the maximum transmit power defined for a currently operating channel is changed, the frame 700 may be used for signaling the changed channel information.

Referring to FIG. 7, the frame 700 includes a category field 710, an action value field 720, a length field 730, a channel power switch mode field 740, a channel power switch count field 750, an operating class field 760, a channel number field 770, and a regulatory maximum transmit power/local power constraint field 780.

The category field 710 represents a category of the corresponding frame, and the action value field 720 represents that the corresponding frame is the channel power management announcement frame.

The length field 730, the channel power switch mode field 740, the channel power switch count field 750, the operating class field 760, the channel number field 770, and the regulatory maximum transmit power/local power constraint field 780 may have the same configurations as the fields included in the channel power management announcement element 500 of FIG. 5. Therefore, descriptions of the length field 730, the channel power switch mode field 740, the channel power switch count field 750, the operating class field 760, the channel number field 770, and the regulatory maximum transmit power/local power constraint field 780 included in the frame 700 are not provided.

Further, a protected dual of public action frame may be defined as shown in Table 8 below.

TABLE 8

| Action Field value | Description |
|---|---|
| <ANA> | Protected Channel Power Management Announcement |

That is, when management frame protection is negotiated, a protected channel power management announcement frame may be used instead of the channel power management announcement frame 700. Here, the protected channel power management announcement frame has the same configuration as the channel power management announcement frame 700. Further, the protected channel power management announcement frame may include information on an encryption key for decrypting payload information.

Hereinafter, a method for enabling the wireless LAN devices to identify information on maximum transmit power of an operating channel or a channel to move to by using the above-described information element or frame will be described.

FIGS. 8 to 11 illustrate an example of performing power switching in an operating channel by devices belonging to the wireless network by using the information element or frame according to the present invention.

Referring to FIGS. 8 to 11, the wireless LAN system includes at least one basic service set (BSS) 810 and a distribution system (DS, not illustrated).

The BSS is a set of terminals capable of performing communication with successful synchronization, and does not indicate a specific region.

The distribution system is a mechanism for communication between terminals, and is not necessarily a network. If the distribution system is capable of providing the distribution service defined in the IEEE 802.11 standard, a form of the distribution system is not limited. For example, the distribution system may be a wireless network such as a mesh network or a physical structure for interconnecting APs.

The BSS 810 may include an AP 801 for controlling a corresponding wireless network and stations 803, 805, and 807 associated with the AP 801 to operate. Here, it is assumed that the AP 801 and the stations 803, 805, and 807 in the BSS 810 are terminals that may use the TVWS.

The AP 801 is a functional medium that enables access to the distribution system via a wireless medium, for the stations 803, 805, and 807 associated with the corresponding wireless network. Further, the AP 801 serves to manage and control the stations 803, 805, and 807 belonging to the corresponding wireless network.

The AP 801 may also be referred to as a centralized controller, a base station (BS), node-B, a base transceiver system (BTS), or a site controller. In addition, the stations 803, 805, and 807 may also be referred to as terminals, wireless transmit/receive units (WTRUs), user equipments (UEs), mobile stations (MSs), mobile terminals, or mobile subscriber units.

Figure 8:
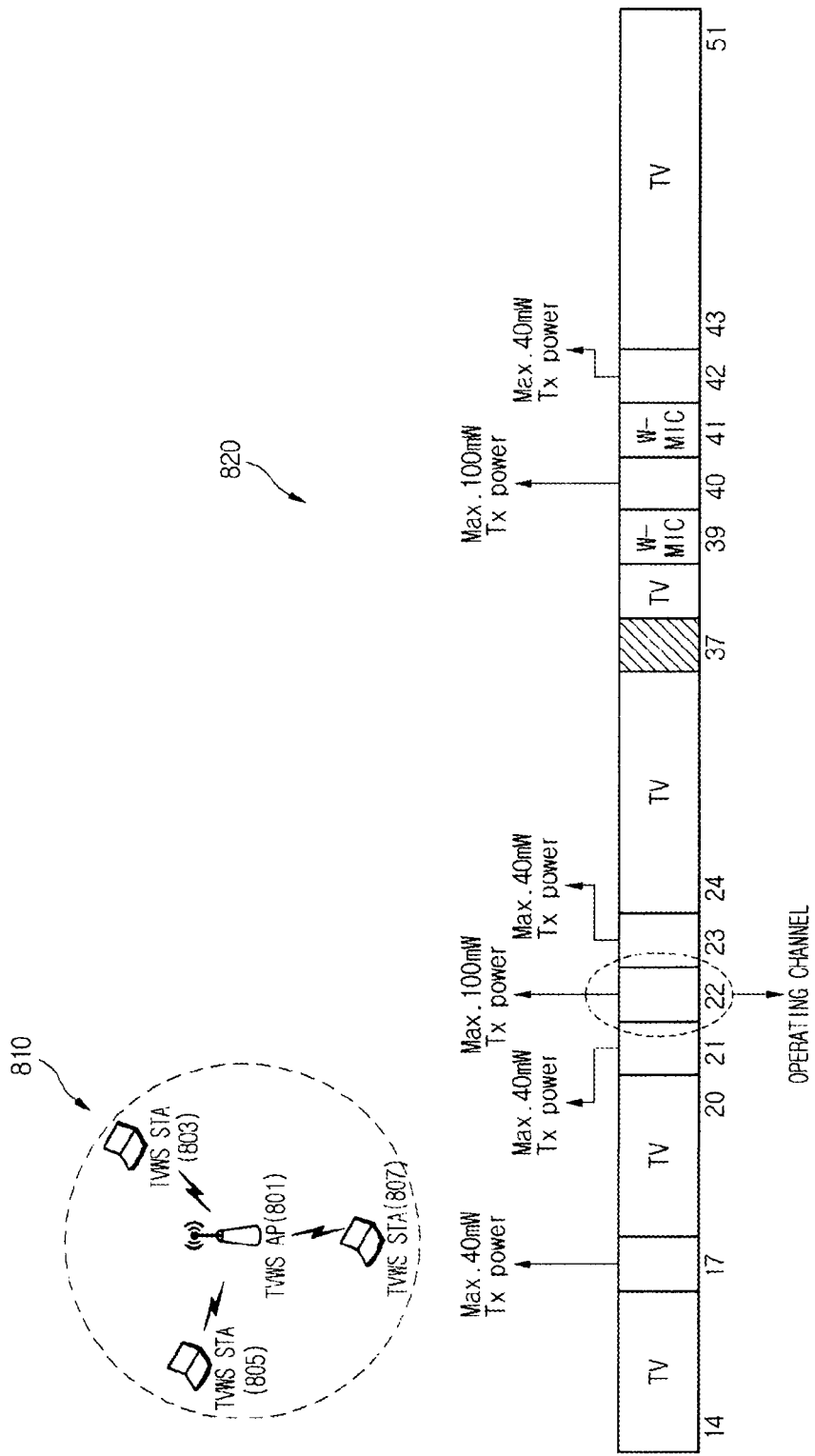
FIGS. 8 to 11 illustrate an example of performing power switch by devices belonging to a wireless network.

Referring to FIG. 8, the AP 801 and the stations 803, 805, and 807 in the wireless network 810 perform communication by using channel 22 of a TVWS channel map 820. Here, since a TV signal does not exist in channels 21 and 23 adjacent to the channel 22, the AP 801 and the stations 803, 805, and 807 belonging to the network 810 may perform communication with maximum transmit power of 100 mW.

Figure 9:
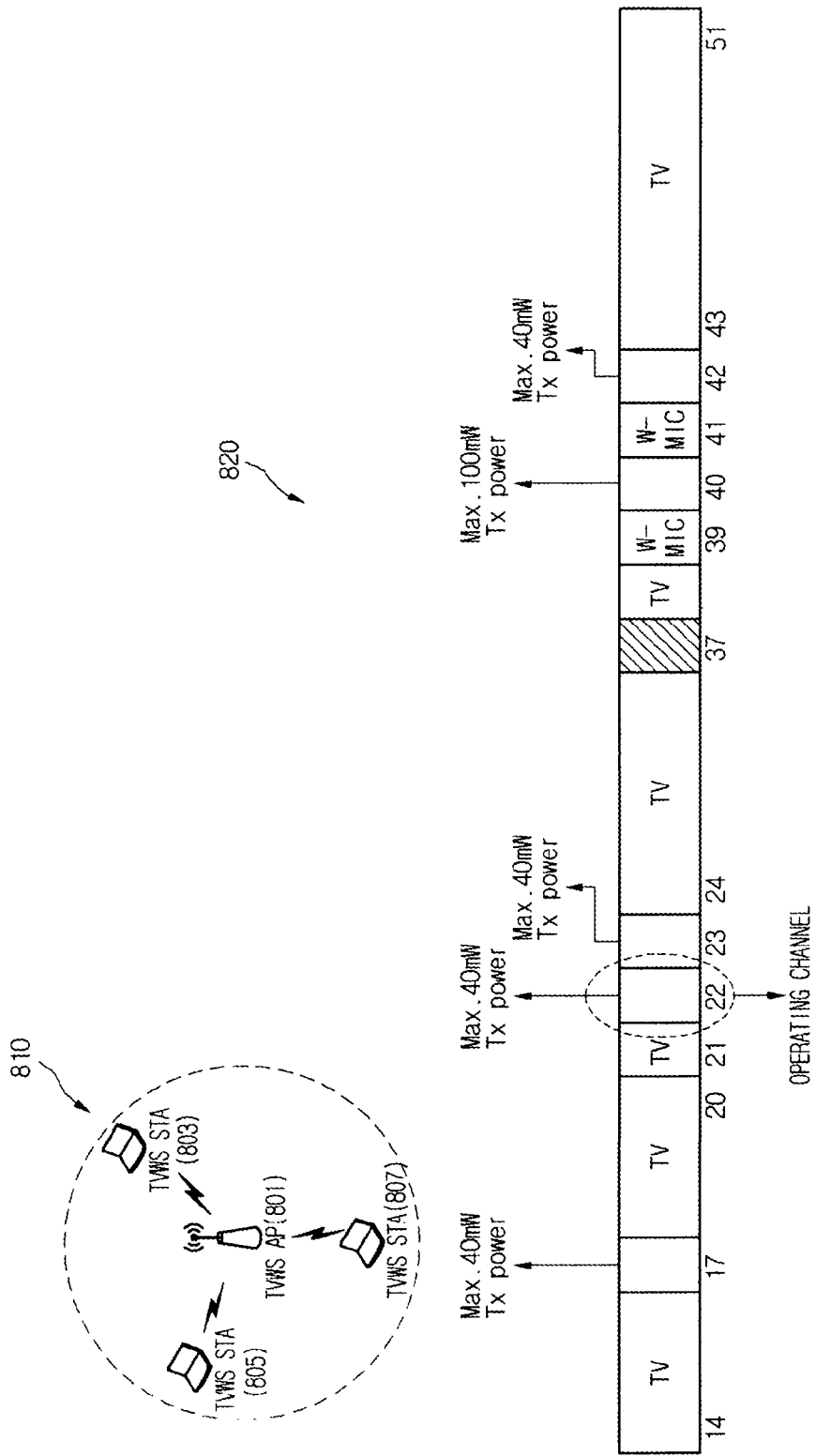

Referring to FIG. 9, while the devices belonging to the wireless network 810 perform communication by using the channel 22, a TV broadcasting station initiates TV broadcasting by using the channel 21 adjacent to the channel 22.

Here, the AP 801 may recognize the existence of the TV signal in the adjacent channel by periodically accessing a geo-location database and updating obtained available channel list information.

Further, the AP 801 may recognize the existence of the TV signal on the basis of spectrum sensing results reported from the stations 803, 805, and 807 managed by the AP 801. Here, the spectrum sensing is performed by the wireless LAN devices in the wireless network using the TVWS to detect whether a licensed device (or primary user) exits within the coverage of the network.

Since the TV signal is a licensed user, the network 810 needs to limit the maximum transmit power of the current channel to 40 mW so as to prevent interference on the TV signal existing in the adjacent channel. In addition, although the TV signal is described as a licensed user in the present embodiment, the licensed user is not limited thereto.

Figure 10:
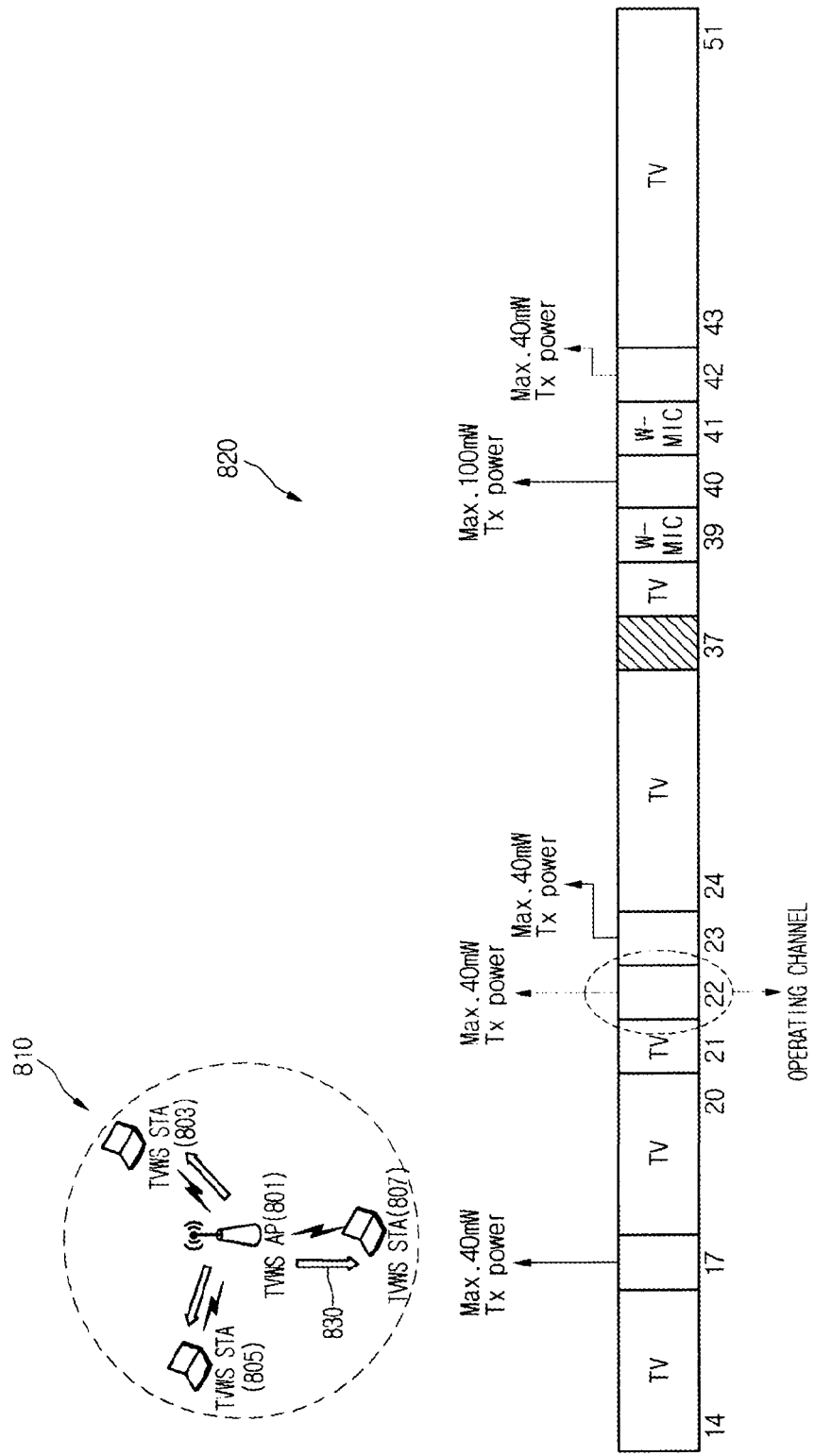

Thereafter, referring to FIG. 10, the AP 801 transmits, to the stations 803, 805, and 807 belonging to the network 810, a frame 830 including the channel power management announcement element 500. Here, the frame 830 may be the beacon frame, the probe response frame, the association response frame, or the reassociation response frame.

Further, the AP 801 may transmit, to the stations 803, 805, and 807, an additional frame, i.e. the channel power management announcement frame 700.

The frame 830 transmitted by the AP 801 includes information for instructing the stations to decrease the regulatory maximum transmit power of a currently operating channel from 100 mW to 40 mW. Further, the channel power management mode field 530, 740 of the frame 830 includes a value set to '2' or '3', and the regulatory maximum transmit power field 570, 780 includes a value set to 40 mW of the regulatory maximum transmit power.

Figure 11:
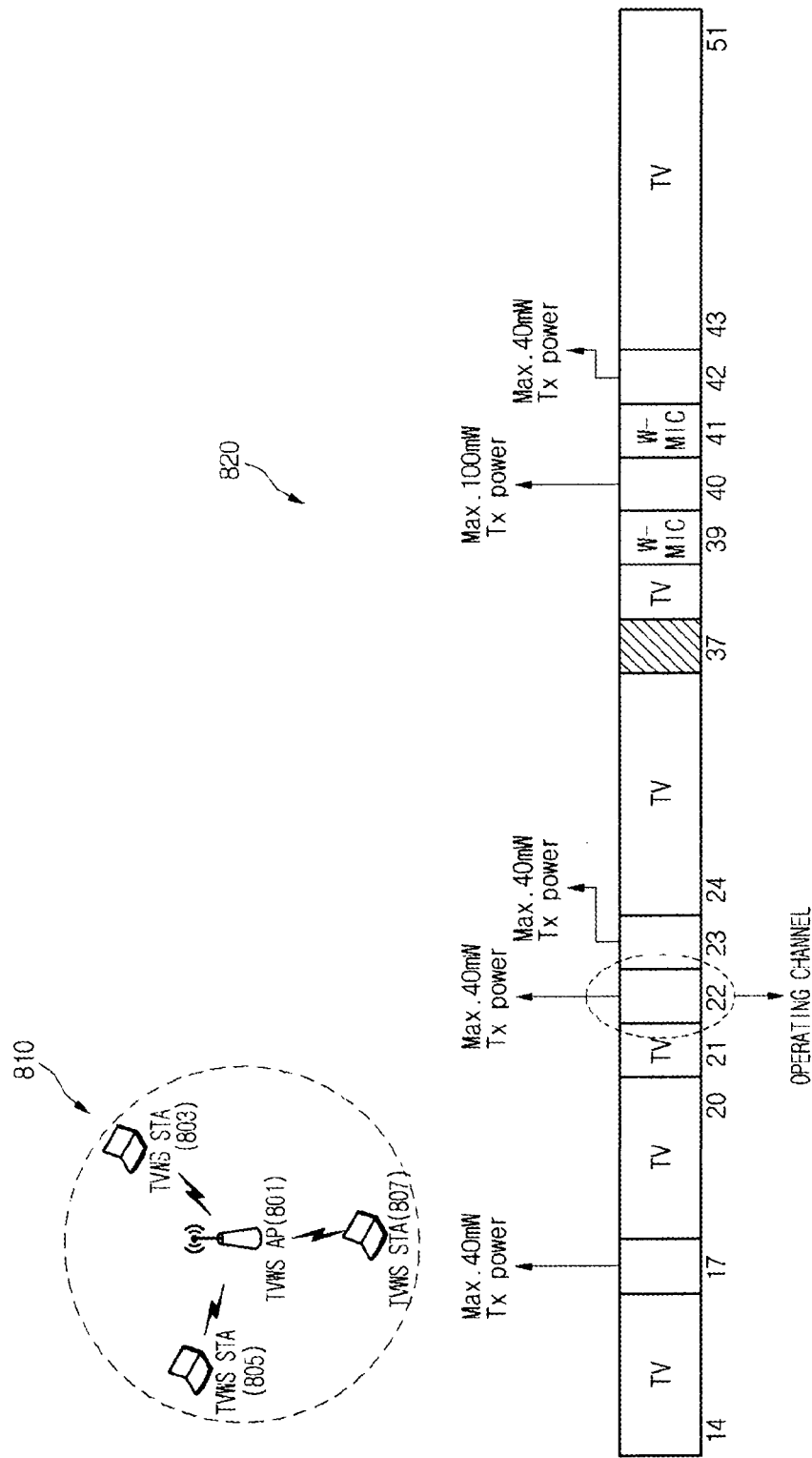

Thereafter, referring to FIG. 11, the stations 803, 805, and 807 obtain information on a current channel by using the frame 830 received from the AP 801.

That is, the stations 803, 805, and 807 may identify not the channel switching but the power switching in an operating channel by analyzing the channel power management mode field of the received frame 830. Further, the stations 803, 805, and 807 may identify the available maximum transmit power in a currently operating channel by analyzing the regulatory maximum transmit power field.

When the receiving processes of the stations 803, 805, and 807 are completed, the AP 801 and the stations 803, 805, and 807 belonging to the wireless network start communication again in an operating channel (channel 22) by using the maximum transmit power of 40 mW.

FIGS. 12 to 15 illustrate an example of performing channel switching by devices belonging to the wireless network by using the information element or frame according to the present invention.

Figure 12:
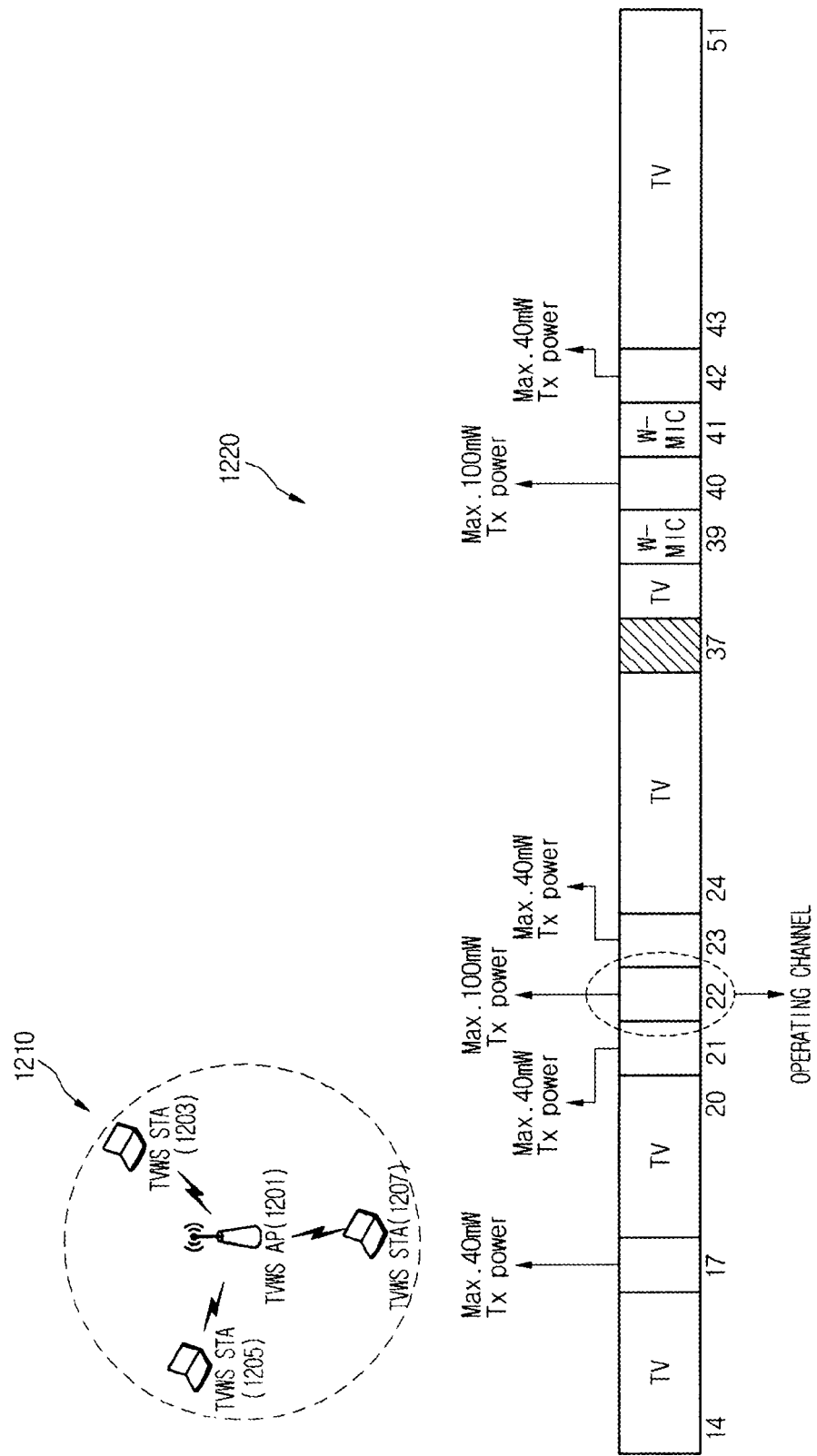
FIGS. 12 to 15 illustrate an example of performing channel switch by devices belonging to a wireless network.

Referring to FIG. 12, a wireless network (BSS) 1210 using the TVWS includes one AP 1201 and first to third stations 1203, 1205, and 1207 associated with the AP 1201.

The AP 1201 and the first to third stations 1203, 1205, and 1207 existing in the wireless network 1210 perform communication by using channel 22 of a TVWS channel map 1220. Here, since a TV signal does not exist in channels 21 and 23 adjacent to the channel 22, the AP 1201 and the first to third stations 1203, 1205, and 1207 belonging to the network 1210 may perform communication with maximum transmit power of 100 mW.

Figure 13:
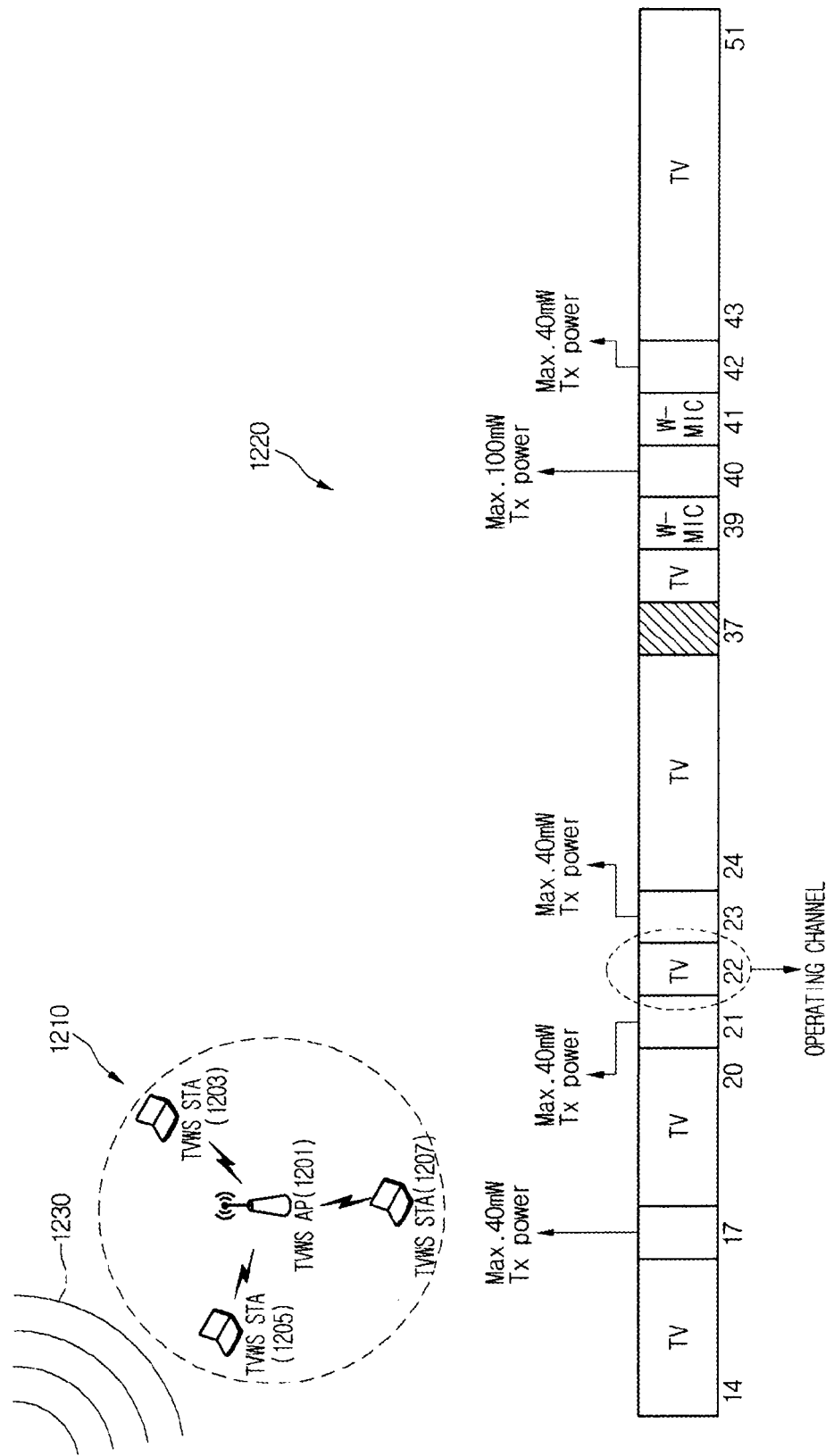

Referring to FIG. 13, while the devices belonging to the wireless network 1210 perform communication by using the channel 22, a TV broadcasting station initiates TV broadcasting by using the channel 22.

Here, the AP 1201 may recognize the appearance of the TV signal 1230 in the current channel by periodically accessing the geo-location database and updating available channel list information. Further, the AP 1201 may recognize the appearance of the TV signal 1230 by periodically performing spectrum sensing. Further, the AP 1201 may also recognize the appearance of the TV signal 1230 on the basis of spectrum sensing results reported from the stations 1203, 1205, and 1207 managed by the AP 1201.

Since the TV signal 1230 is a licensed user, the network 1210 should move to another available channel. Although the TV signal is described as a licensed user in the present embodiment, the licensed user is not limited thereto.

Figure 14:
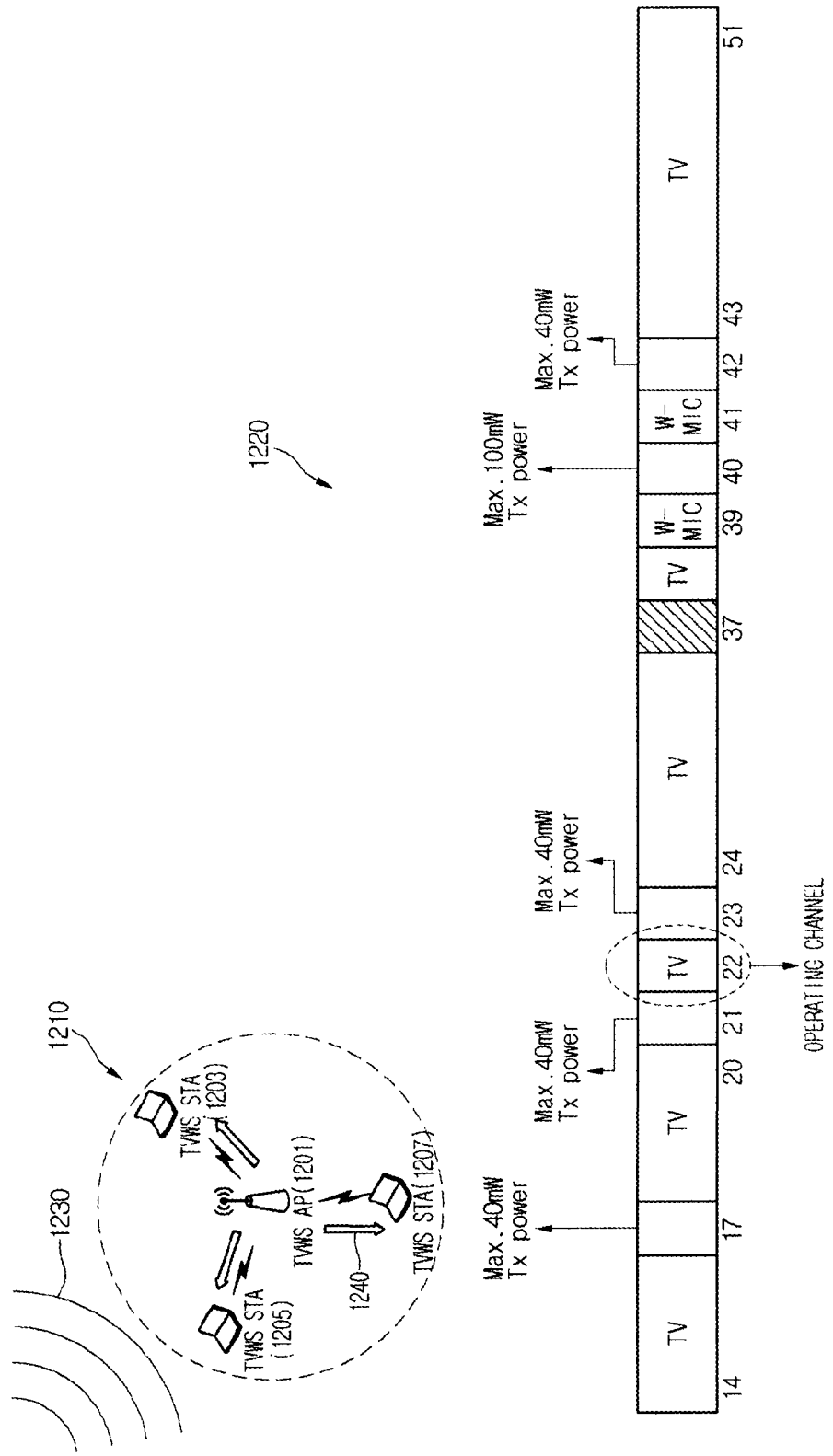

Thereafter, referring to FIG. 14, it is assumed that the network 1210 moves to a new channel, i.e. channel 21. Here, referring to the channel map 1220, a TV signal does not exist in an adjacent channel to the current channel (channel 22), but a TV signal exists in an adjacent channel to the new channel 22. Therefore, the maximum transmit power for the wireless LAN devices desired to move to the channel 21 should be limited to 40 mW.

To this end, the AP 1201 transmits, to the stations 1203, 1205, and 1207 belonging to the network 1210, a frame 1240 including the channel power management announcement element 500. Here, the frame 1240 may be the beacon frame, the probe response frame, the association response frame, or the reassociation response frame.

Further, the AP 1201 may transmit, to the stations 1203, 1205, and 1207, an additional frame, i.e. the channel power management announcement frame 700, 1240.

The frame 1240 transmitted by the AP 1201 includes information on the switching from the current channel to the new channel and the regulatory maximum transmit power in the new channel. For example, the channel power management mode field 530, 740 of the frame 1240 includes a value set to '4' or '5', and the regulatory maximum transmit power field 570, 780 includes a value set to 40 mW of the regulatory maximum transmit power.

Figure 15:
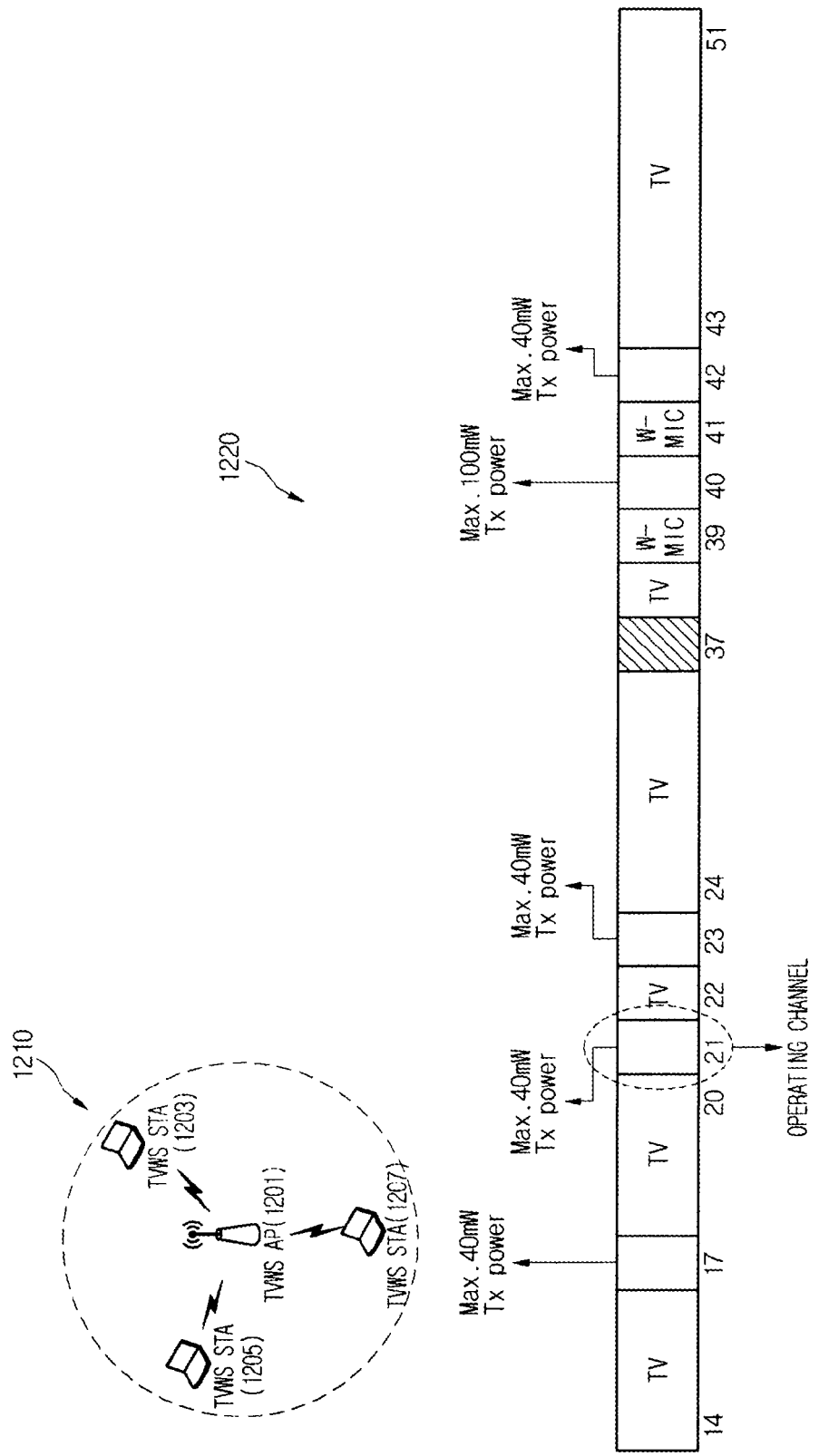

Thereafter, referring to FIG. 15, the stations 1203, 1205, and 1207 obtain information on the new channel by using the frame 1240 received from the AP 1201.

That is, the stations 1203, 1205, and 1207 may identify not the power switching but the switching to the new channel by analyzing the channel power management mode field of the received frame 1240. Further, the stations 1203, 1205, and 1207 may identify the available maximum transmit power in the new channel by analyzing the regulatory maximum transmit power field.

When the receiving processes of the stations 1203, 1205, and 1207 are completed, the AP 1201 and the stations 1203, 1205, and 1207 belonging to the wireless network start communication again in the new channel (channel 21) by using the maximum transmit power of 40 mW.

Figure 16:
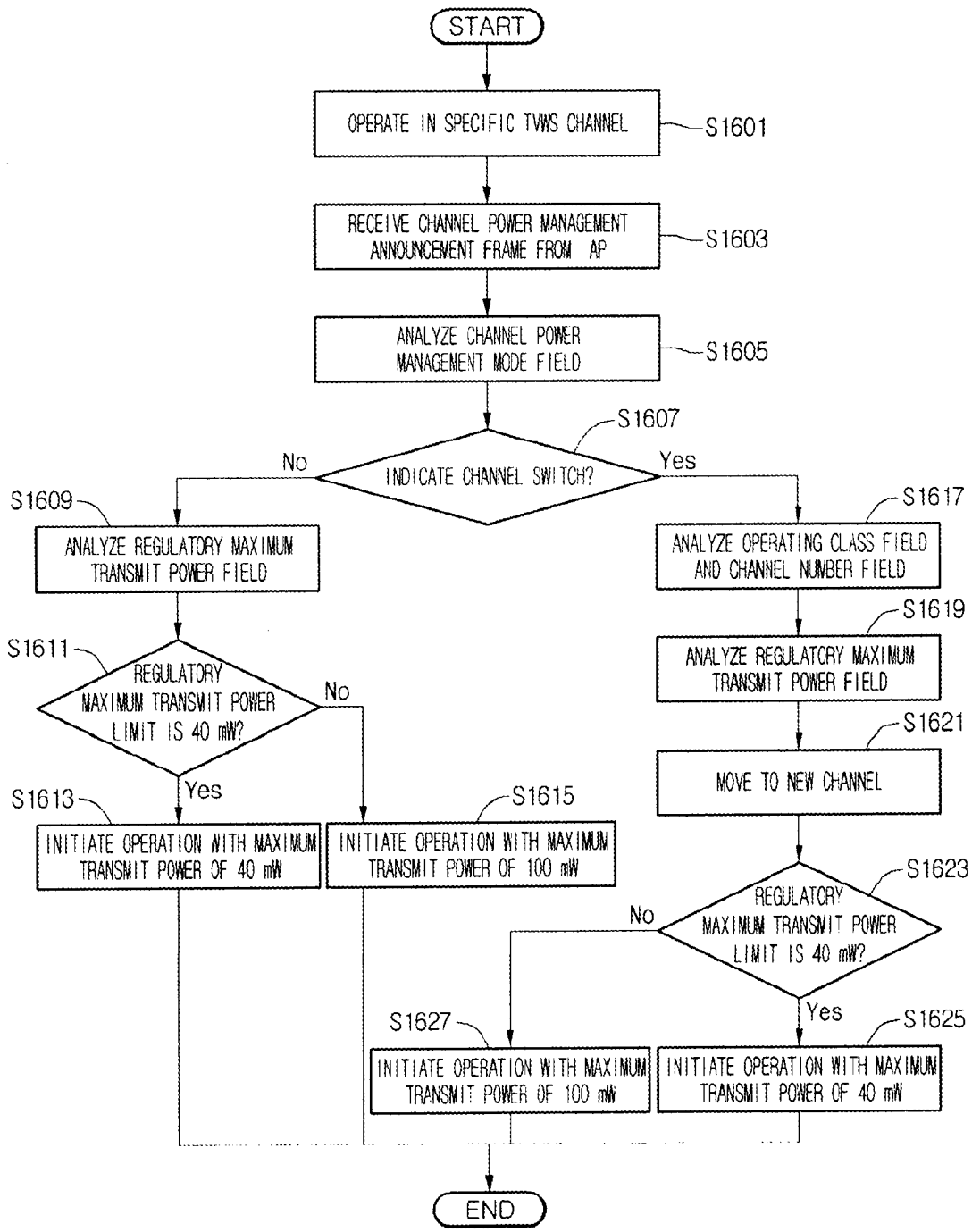
FIG. 16 illustrates a process flow of performing power switch or channel switch by devices belonging to a wireless network by using an information element or frame according to the first embodiment.

FIG. 16 illustrates a process flow of performing power switching or channel switching by devices belonging to a wireless network by using the information element or frame according to the present invention.

Referring to FIG. 16, in step 1601, an AP and stations belonging to the wireless network perform communication by using a specific TVWS channel.

While the communication is performed by using the specific TVWS channel, a TV signal may appear in an adjacent channel to the specific TVWS channel. In this case, in order to prevent interference on the TV signal, the AP needs to announce the regulatory maximum transmit power in the operating channel.

Further, while the communication is performed by using the specific TVWS channel, a TV signal may appear in this channel. In this case, the AP needs to announce switching from the current channel to a new channel and the regulatory maximum transmit power in the new channel.

In step 1603, the stations receive, from the AP, a frame including a channel power management announcement element or an additional channel power management announcement frame. When the receiving the frame is completed, next step 1605 is performed.

In step 1605, the stations analyze the channel power management mode field of the received frame. Here, the channel power management mode field performs signaling to indicate whether a role of the frame is to switch transmit power on the operating channel or to switch channels.

In step 1607, the stations determine whether the channel power management mode field indicates channel switching on the basis of a result of the analysis in step 1605. When the result indicates not the channel switching but the power switching in the operating channel, step 1609 is performed.

In step 1609, the stations analyze the regulatory maximum transmit power field of the received frame. Thereafter, in step 1611, it is determined whether the regulatory maximum transmit power in the operating channel is 40 mW on the basis of a result of the analysis on the field.

When the regulatory maximum transmit power is 40 mW, step 1613 is performed. In step 1613, the devices belonging to the wireless network start communication again in the current channel with the maximum transmit power of 40 mW. When the regulatory maximum transmit power is 100 mW, step 1615 is performed. In step 1615, the devices belonging to the wireless network start communication again in the current channel with the maximum transmit power of 100 mW.

When it is determined that the channel power management mode field indicates the channel switching in step 1607, step 1617 performed.

In step 1617, the stations analyze the operating class and channel number fields of the received frame. By analyzing the fields, the stations may identify the channel number and channel bandwidth of a channel to move to.

In step 1619, the stations analyze the regulatory maximum transmit power field of the received frame. By analyzing the field, the stations may identify the available maximum transmit power in a channel to move to.

In step 1621, the stations move to a new channel from the current channel on the basis of a result of the analysis on the operating class and channel number fields.

Thereafter, in step 1623, the stations determine whether the regulatory maximum transmit power is 40 mW on the basis of a result of the analysis on the regulatory maximum transmit power field.

When the regulatory maximum transmit power is 40 mW, step 1625 is performed. In step 1625, the devices belonging to the wireless network start communication in the new channel with the maximum transmit power of 40 mW.

When the regulatory maximum transmit power is 100 mW, step 1627 is performed. In step 1627, the devices belonging to the wireless network start communication in the new channel with the maximum transmit power of 100 mW.

As described above, according to the first embodiment, the wireless LAN devices are enabled to identify information on available maximum transmit power in an operating channel or a channel to move to by using a newly defined information element or frame.

Further, by virtue of the identifying the channel information, the wireless LAN devices may change the maximum transmit power according to whether a TV signal exists in an adjacent channel to thereby prevent interference on the TV channel.

Second Embodiment

According to the regulations of the FCC, a wireless LAN device capable of accessing a geo-location data, from among wireless LAN devices operating in the TVWS, may enable other devices so as to configure a network.

In the case of using the FCC regulations and the dynamic station enablement (DSE) defined in the IEEE 802.11y standard, the wireless LAN device capable of accessing the geo-location database may be an enabling station (hereinafter, referred to as an enabling STA). This enabling STA may approve enablement of available channels for dependent stations (hereinafter, referred to as dependent STAs).

Here, the enabling STA may enable a plurality of TVWS channels for the dependent STAs on the basis of the available channel list obtained from the geo-location database. However, when the available channel list of the geo-location database is changed later, or when a primary user is detected according to a sensing result report from peripheral stations, the enabling STA needs to perform deenablement to a specific channel.

However, the IEEE 8020.11y or IEEE 802.11af standard does not provide a deenablement method for a specific channel. Therefore, a second embodiment provides a method for enabling wireless LAN devices operating in the TVWS to perform deenablement for each channel according to whether a primary user (or TV signal exists.

Hereinafter, the second embodiment will be described in detail with reference to the accompanying drawings.

Figure 17:
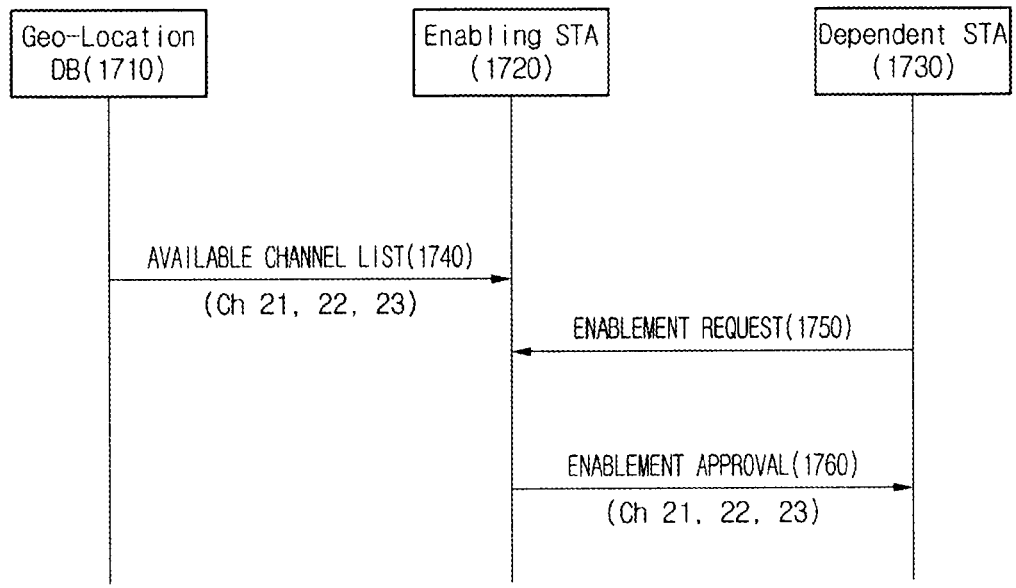
FIG. 17 illustrates an example of performing enablement by an enabling STA and a dependent STA operating in the TVWS.

FIG. 17 illustrates an example of performing enablement by the enabling STA and dependent STA operating in the TVWS.

Referring to FIG. 17, a wireless LAN device capable of accessing a geo-location database (DB) 1710 may become an enabling STA 1720 to perform an enablement process.

Here, the enabling STA 1720 includes location information thereof, and thus may obtain an available channel list 1740 for a corresponding location by accessing the geo-location database 1710. In the present embodiment, it is assumed that available channels of the available channel list are channels 21 to 23.

Thereafter, the dependent STA 1730 transmits a DSE enablement request frame 1750 to the enabling STA 1720.

Then, the enabling STA 1720 transmits a DSE enablement response frame 1760 corresponding to the DSE enablement request frame 1750 to the dependent STA 1730. That is, the enabling STA 1720 approves the enablement request by transmitting the DSE enablement response frame 1760.

Here, the DSE enablement frame defined in the IEEE 802.11y standard may be used for the DSE enablement request frame 1750 transmitted by the dependent STA 1730 and the DSE enablement response frame 1760 transmitted by the enabling STA 1720. In the present embodiment, it is assumed that the enabling STA 1720 approves operating of the dependent STA 1730 in channels 21 to 23.

The dependent STA 1730 selects one of the TVWS channels approved by the enabling STA 1720 in order to operate. In the present embodiment, it is assumed that the dependent STA 1730 selects the channel 22 in order to operate.

When the above-described enablement process is successfully completed, the dependent STA 1730 is associated with the enabling STA 1720 so as to start a wireless network operation.

Figure 18:
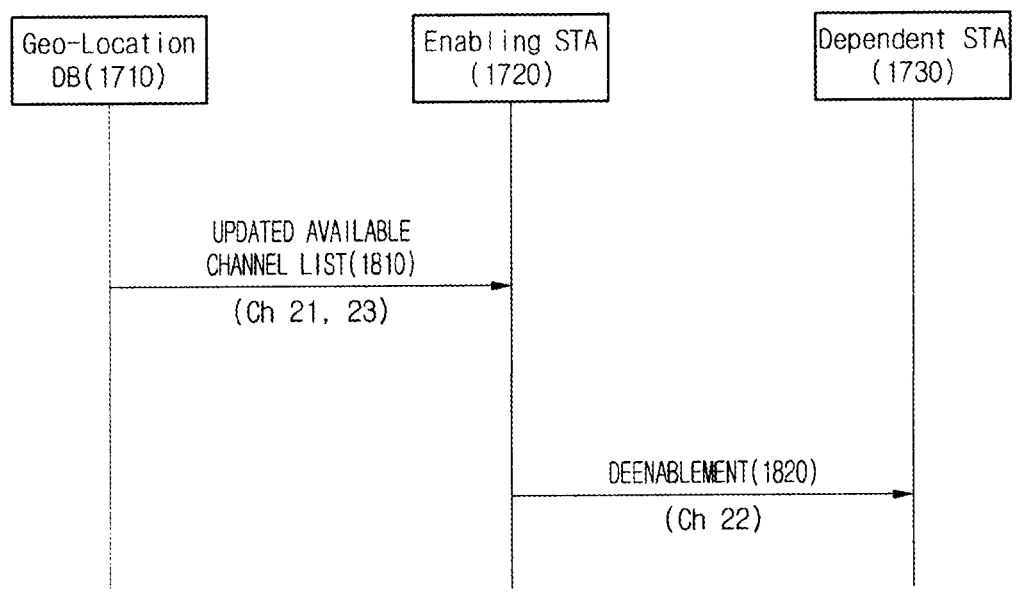
FIG. 18 illustrates an example of performing deenablement by the enabling STA and dependent STA of FIG. 17.

FIG. 18 illustrates an example of performing deenablement by the enabling STA and dependent STA of FIG. 17.

Referring to FIG. 18, the enabling STA 1720 may periodically access the geo-location database 1720 to update the available channel list. For example, the enabling STA 1720 may access the geo-location database 1720 at predetermined time intervals to update the available channel list.

In the present embodiment, it is assumed that the channels 21 and 23 are updated. That is, it is assumed that the channel 22 that is currently operating in the wireless network is no more available due to appearance of a primary user (or TV signal).

Since the operating channel is no more available due to the primary user, the enabling STA 1720 deenables the dependent STA 1730, for which enablement has been approved by the enabling STA 1720, from operating in the channel 22. Here, the enabling STA 1720 requests deenablement for a specific channel by using a DSE extended deenablement frame 1820.

The DSE extended deenablement frame 1820 is newly defined in order to overcome a problem of the DSE deenablement public action frame defined in the IEEE 802.11y standard, i.e. a problem of inability to perform deenablement for a specific channel. Hereinafter, the DSE deenablement public action frame defined in the IEEE 802.11y and the DSE extended deenablement frame proposed by the present invention will be described in detail.

Figure 19:
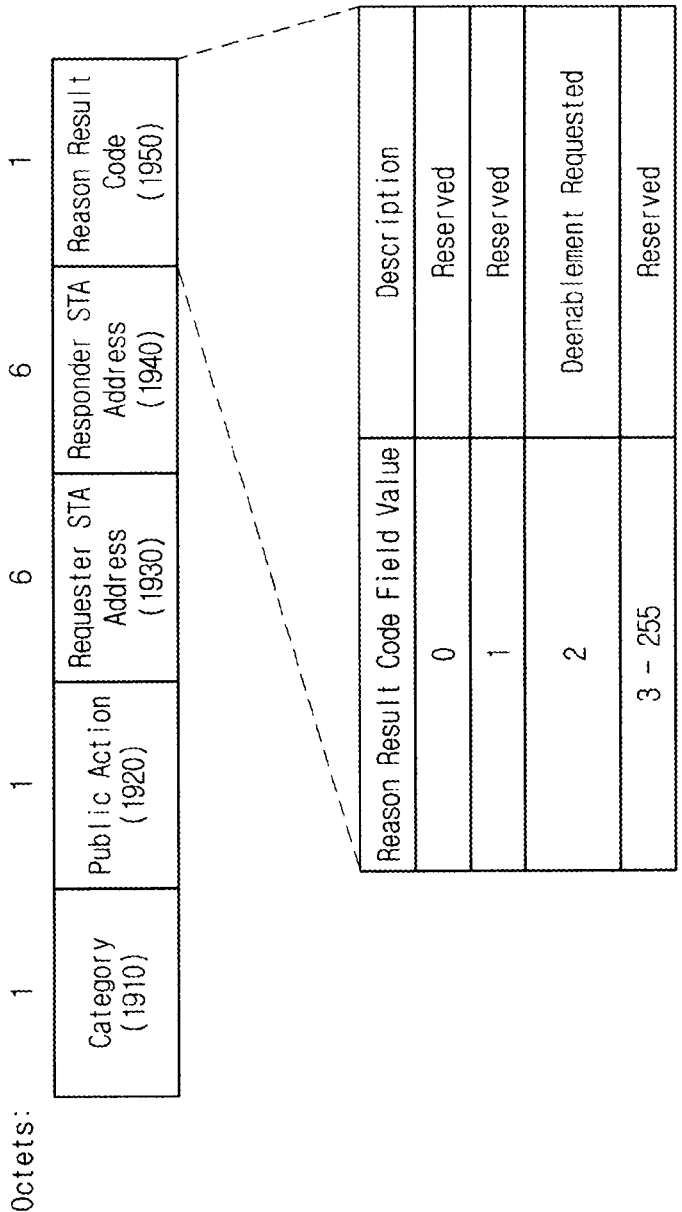
FIG. 19 illustrates a structure of the DSE deenablement public action frame defined in the IEEE 802.11y standard.

FIG. 19 illustrates a structure of the DSE deenablement public action frame defined in the IEEE 802.11y.

Referring to FIG. 19, the DSE deenablement public action frame 1900 includes a category field 1910, a public action field 1920, a requester STA address field 1930, a responder STA address field 1940, and a reason result code field 1950.

The category field 1910 represents a category of the corresponding frame, and the public action field 1920 represents that the corresponding frame is the DSE deenablement frame.

The requester STA address field 1930 represents a media access control (MAC) address of a station requesting deenablement. Here, a length of the requester STA address field 1930 is 6 octets.

The responder STA address field 1940 represents a MAC address of a station deenabled. Here, a length of the responder STA address field 1940 is 6 octets.

The reason result code field 1950 is used to represent a reason why the DSE deenablement frame 1900 is generated. According to this generation reason, one of the field values shown in FIG. 19 may be allocated.

For example, when the enabling STA sets a value of the reason result code field 1950 of the DSE deenablement frame 1900 to '2', this value indicates that the frame 1900 has been generated to request deenablement.

Figure 20:
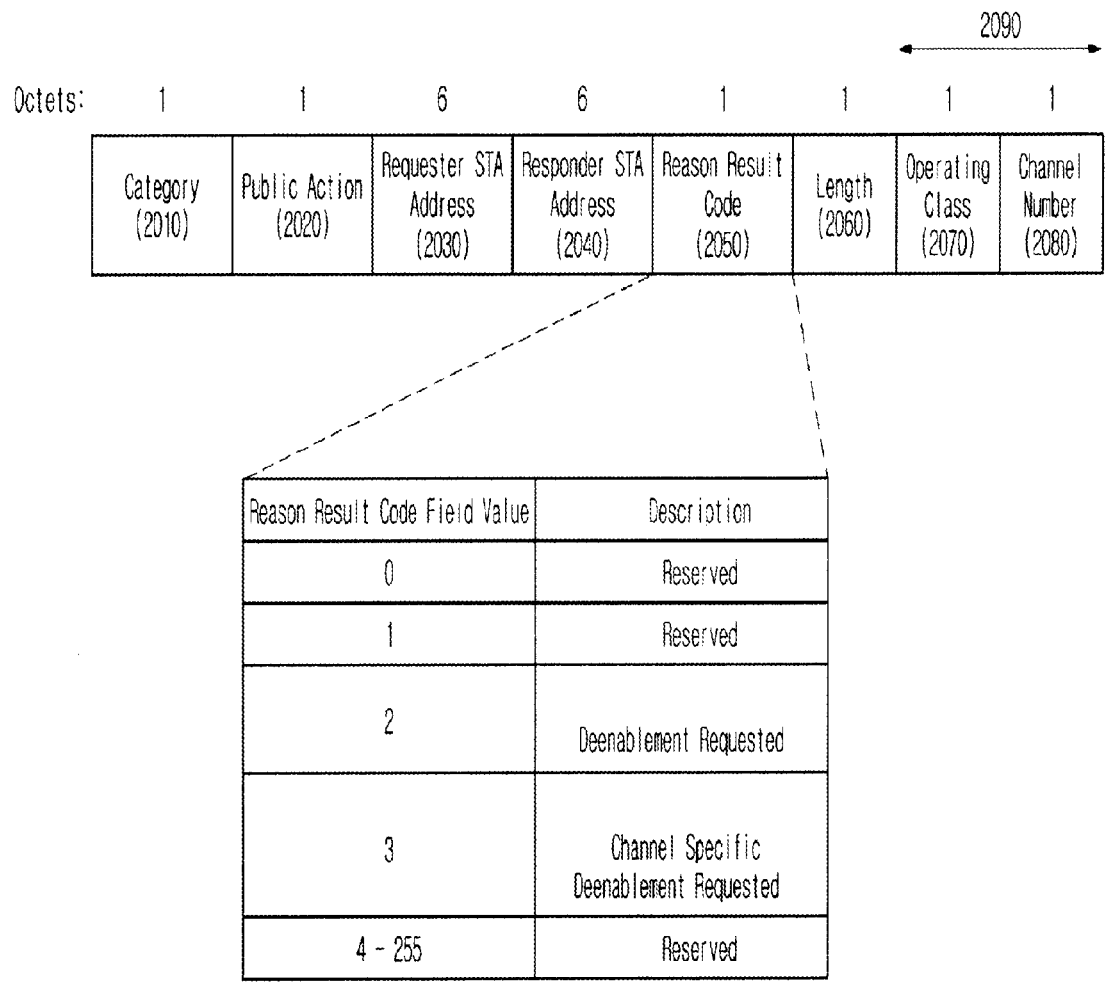
FIG. 20 illustrates a structure of a DSE extended deenablement frame according to a second embodiment.

FIG. 20 illustrates a structure of the DSE extended deenablement frame according to the second embodiment.

Referring to FIG. 20, the DSE extended deenablement frame 2000 includes a category field 2010, a public action field 2020, a requester STA address field 2030, a responder STA address field 2040, a reason result code field 2050, a length field 2060, an operating class field 2070, and a channel number field 2080.

The category field 2010 represents a category of the corresponding frame, and the public action field 2020 represents that the corresponding frame is the DSE extended deenablement frame.

The requester STA address field 2030 represents a media access control (MAC) address of a station requesting deenablement. Here, a length of the requester STA address field 2030 is 6 octets.

The responder STA address field 2040 represents a MAC address of a station deenabled. Here, a length of the responder STA address field 2040 is 6 octets.

The reason result code field 2050 is used to represent a reason why the DSE extended deenablement frame 2000 is generated. According to this generation reason, one of the field values shown in FIG. 20 may be allocated.

For example, when the enabling STA sets a value of the reason result code field 2050 of the DSE extended deenablement frame 2000 to '2', this value indicates that the frame 2000 has been generated to request deenablement.

When the enabling STA sets a value of the reason result code field 2050 of the DSE extended deenablement frame 2000 to '3', this value indicates that the frame 2000 has been generated to request deenablement for a specific channel.

The length field 2060 represents lengths of the operating class field 2070 and channel number field 2080. Therefore, the operating class field 2070 and channel number field 2090 may be repeated by as much as the length specified in the length field 2060. The operating class field and channel number field 2090 may be repeated by as much as the number of channels. The value of the length field 2060 may be variable, and a minimum value thereof is 1.

The operating class field 2070 represents a number of an operating class of a channel for which deenablement is requested. The channel number field 2080 represents a number of the channel for which deenablement is requested.

In particular, the length field 2060, the operating class field 2070, and the channel number field 2080 exist only when the value of the reason result code field 2050 is set to '3'.

Referring to FIG. 18, the enabling STA 1720 transmits, to the dependent STA 1730, the DSE extended deenablement frame 2000 in which the reason result code field 2050 is set to '3' and the channel number field 2080 is set to 'channel 22' in order to request deenablement for the channel 22.

Then, the dependent STA 1730 accepts the request and stops operating at the channel 22 where the dependent STA 1730 is operating.

As described above, the enabling STA 1720 may perform deenablement for a specific channel by using the DSE extended deenablement frame 2000 proposed by the present invention.

Figure 21:
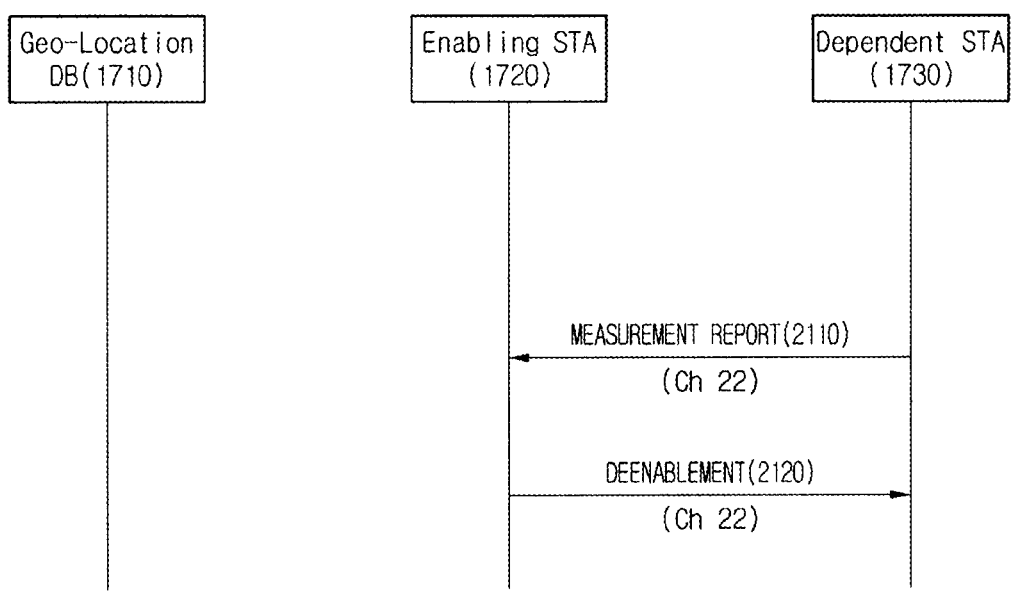
FIG. 21 illustrates another example of performing deenablement by the enabling STA and dependent STA of FIG. 17.

FIG. 21 illustrates another example of performing deenablement by the enabling STA and dependent STA of FIG. 17.

Referring to FIG. 21, the dependent STA 1730 detects a primary user (or TV signal) by means of spectrum sensing. For example, the dependent STA 1730 performs the spectrum sensing at predetermined intervals to detect a TV signal in currently operating channel 22.

Thereafter, the dependent STA 1730 reports that the TV signal is detected in the channel 22 to the enabling STA 1720. Here, the dependent STA 1730 reports by using the radio measurement report frame defined in the IEEE 802.11k standard.

The enabling STA 1720 receives the radio measurement report frame to recognize that the TV signal is detected in the channel 22. Thereafter, the enabling STA 1720 deenables the dependent STA 1730, for which enablement has been approved by the enabling STA 1720, from operating in the channel 22.

Here, the enabling STA 1720 performs deenablement for a specific channel by using the above-described DSE extended deenablement frame 2000.

More specifically, the enabling STA 1720 transmits, to the dependent STA 1730, the DSE extended deenablement frame 2000 in which the reason result code field 2050 is set to '3' and the channel number field 2080 is set to 'channel 22' in order to request deenablement for the channel 22.

Then, the dependent STA 1730 accepts the request and stops operating at the channel 22 where the dependent STA 1730 is operating.

As described above, the enabling STA 1720 may perform deenablement for a specific channel by using the DSE extended deenablement frame 2000 proposed by the present invention.

Figure 22:
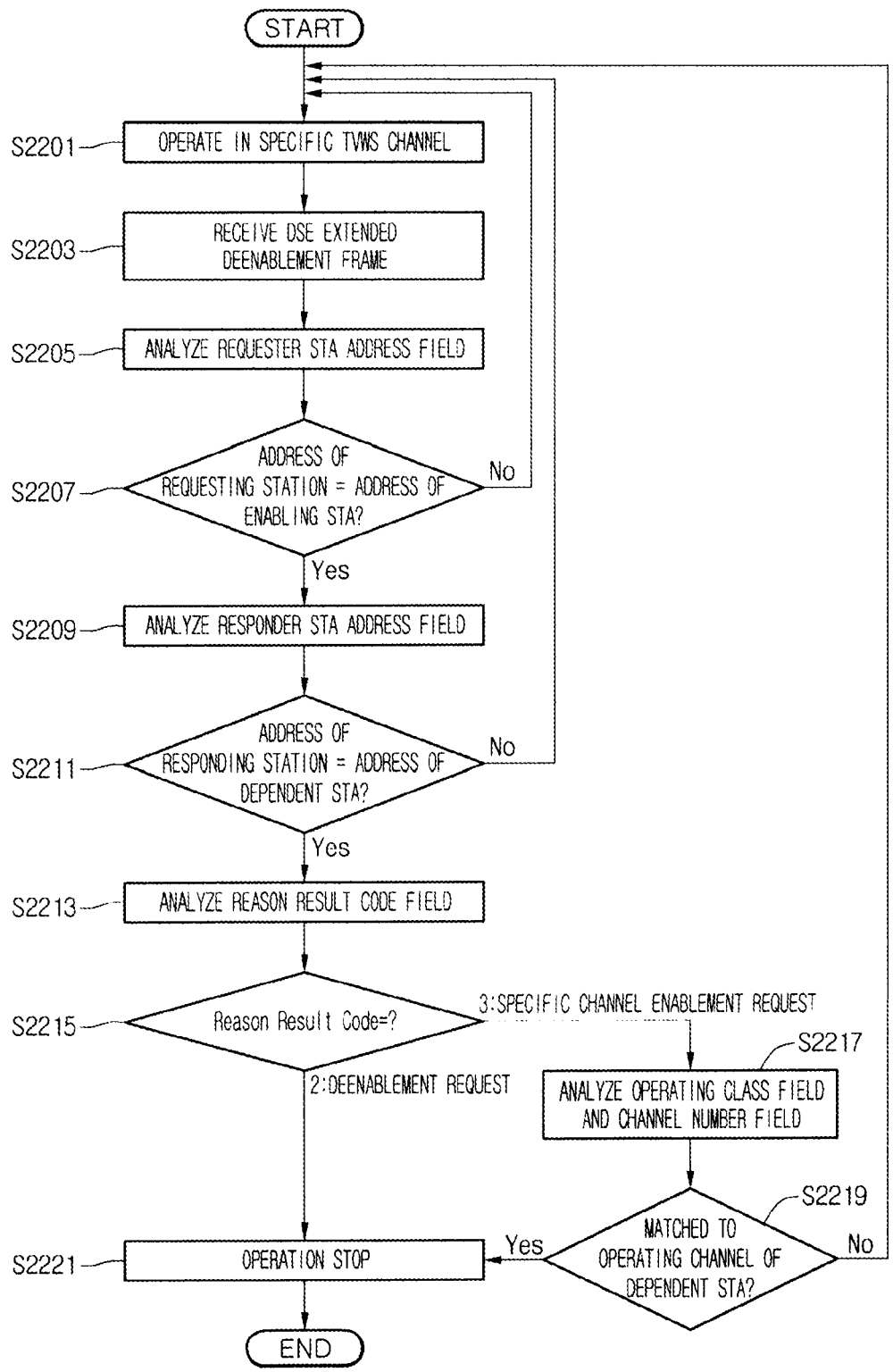
FIG. 22 is a flowchart illustrating a process of performing deenablement by using the DSE extended deenablement frame according to the second embodiment.

FIG. 22 illustrates a process flow of performing deenablement to the dependent STA by the enabling STA using the DSE extended deenablement frame.

Referring to FIG. 22, in step 2201, the dependent STA selects one from TVWS channels, for which enablement has been approved by the enabling STA, in order to initiate an operation.

In step 2203, the dependent STA receives the DSE extended deenablement frame from the enabling STA.

The enabling STA transmits the DSE extended deenablement frame when an updated available channel list is obtained or when a radio measurement report frame reporting that a primary user is detected in an enablement-approved channel is received.

In step 2205, the dependent STA analyzes the requester STA address field of the DSE extended deenablement frame. Thereafter, in step 2207, the dependent STA confirms whether an address of a requesting station matches an address of the enabling STA.

When the addresses do not match each other, the process flow moves to step 2201 in order to perform a wireless network operation. When the addresses match each other, the process flow moves to next step 2209.

In step 2209, the dependent STA analyzes the responder STA address field of the DSE extended deenablement frame. Thereafter, in step 2211, the dependent STA confirms whether an address of a responding station matches an address of the dependent STA.

When the addresses do not match each other, the process flow moves to step 2201 in order to perform a wireless network operation. When the addresses match each other, the process flow moves to next step 2213.

In step 2213, the dependent STA analyzes the reason result code field of the DSE extended deenablement frame.

Thereafter, in step 2215, the dependent STA confirms whether there is a field value indicating a deenablement request. Here, when the value of the reason result code field is set to '2', this value indicates that the corresponding frame has been generated to request deenablement. When the value of the reason result code field is set to '3', this value indicates that the corresponding frame has been generated to request deenablement for a specific channel.

When it is confirmed that the value of the reason result code field is set to '2', the process flow moves to next step 2221. In step 2221, the dependent STA is deenabled and stops operating for all channels.

When it is confirmed that the value of the reason result code field is set to '3', the process flow moves to next step 2217. In step 2217, the dependent STA analyzes the operating class field and channel number field of the DSE extended deenablement frame.

Thereafter, in step 2219, the dependent STA confirms whether the operating class and channel number of the received frame match the operating channel of the dependent STA. When the operating class and channel number do not match the operating channel, the process flow moves to step 2201 in order to perform a wireless network operation.

When the operating class and channel number match the operating channel, the process flow moves to next step 2221. In step 2221, the dependent STA is deenabled and stops operating for a specific channel.

As described above, according to the second embodiment, the enabling STA operating in the TVWS may deenable the dependent STA with respect to a specific channel or all channels.

Figure 23:
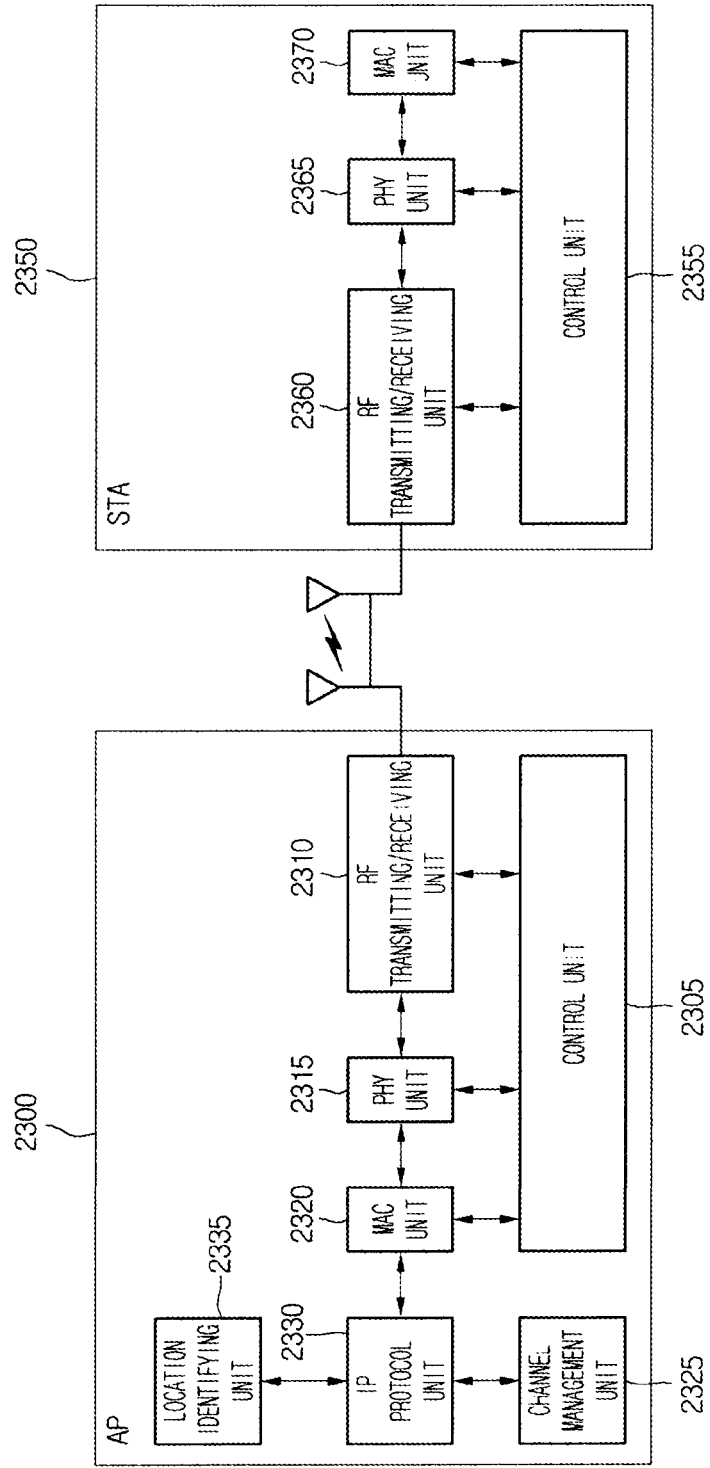
FIG. 23 is a block diagram illustrating wireless LAN devices in which the embodiments may be implemented.

FIG. 23 is a block diagram illustrating wireless LAN devices in which the embodiments may be implemented.

Referring to FIG. 23, the wireless LAN devices include an AP 2300 and a station 2350. Each of the AP 2300 and station 2350 includes a control unit 2305 or 2355, an RF transmitting/receiving unit 2310 or 2360, a PHY unit 2315 or 2375, and a MAC unit 2320 or 2370. The AP 2300 may further include a channel management unit 2325, an IP protocol unit 2330, and a location identifying unit 2335.

The RF transmitting/receiving unit 2310 or 2360 serves to convert a signal inputted from the PHY unit 2315 or 2375 that is a physical layer into an RF signal, and then transmit the converted signal via an antenna after filtering and amplifying the converted signal.

The RF transmitting/receiving unit 2310 or 2360 converts the RF signal received from the antenna into a signal that can be processed in the PHY unit 2315 or 2375 by performing a filtering operation. The RF transmitting/receiving unit 2310 or 2360 may have a switch function for switching between transmission and reception of the signal.

The PHY unit 2315 or 2375 performs forward error correction (FEC) encoding and modulation to data requested to be transmitted from the MAC unit 2320 or 2370 that is a media access control (MAC) layer, and performs a process of adding signals such as a preamble and a pilot to transmit the processed data to the RF transmitting/receiving unit 2310 or 2360.

The PHY unit 2315 or 2375 performs demodulation, equalization, and FEC decoding to the signal received via the RF transmitting/receiving unit 2310 or 2360, and performs a process of removing the added preamble and pilot to transmit the processed signal to the MAC unit 2320 or 2370. For these operations, the PHY unit 2315 or 2375 may include a modulator, a demodulator, an equalizer, a FEC encoder, and a FEC decoder.

The MAC unit 2320 or 2370 processes data transferred from an upper layer, i.e. the data requested to be transmitted, and then outputs the processed data to the PHY unit 2315 or 2375 and performs additional transmission for transferring the data.

The MAC unit 2320 or 2370 processes received data inputted from the PHY unit 2315 or 2375 to transmit the processed data to an upper layer, and performs additional transmission for transferring the data.

The IP protocol unit 2330 processes data inputted from an upper layer to transmit the processed data to the MAC unit 2320 or 2370, and processes data inputted from the MAC unit 2320 or 2370 to transmit the processed data to an upper layer.

The location identifying unit 2335 performs an operation for confirming a location thereof The channel management unit 2325 accesses a geo-location database by using information on the location confirmed by the location identifying unit 2235, and obtains a list of TVWS channels that are available at the location. The channel management unit 2325 selects at least one channel from the obtained TVWS channel list and performs an operation for initiating a wireless network in the channel.

The control unit 2305 or 2355 controls the RF transmitting/receiving unit 2310 or 2360, the PHY unit 2315 or 2375, and the MAC unit 2320 or 2370 in response to a control signal transmitted from an upper layer. The control unit 2305 or 2355 performs various adjusting and managing operations so as to control requests and processing time points among the RF transmitting/receiving unit 2310 or 2370, the PHY unit 2315 or 2375, and the MAC unit 2320 or 2370.

Further, the control unit 2305 or 2355 controls an operation for performing the channel information identifying method according to the first embodiment. For example, the control unit 2305 of the AP 2300 may control an overall process of generating and signaling a frame including information on an operating class, a channel number, and regulatory maximum transmit power. The control unit 2355 of the station 2350 may control an overall process of analyzing a frame received from the AP 2300 and identifying channel information.

Hereinafter, an operation of identifying channel information through a process of signaling between the AP 2300 and the station 2350 will be described in detail.

The AP 2300 may detect that a TV signal appears in an operating channel or an adjacent channel thereto on the basis of periodically updated available channel list information or a result of spectrum sensing. Here, the control unit 2305 generates the channel power management announcement frame 700 in order to announce power switching in an operating channel or a new channel. Further, the control unit 2305 may generate a beacon frame or probe response frame including the channel power management announcement element 500 instead of generating an additional frame.

That is, the control unit 2305 may control the MAC unit 2320 and the PHY unit 2315 so as to generate the channel power management announcement frame. Here, the channel power management announcement frame generated by the control unit 2305 includes information on a channel power management mode, an operating class, a channel number, and regulatory maximum transmit power.

The MAC unit 2320 processes data transferred from an upper layer, i.e. the data requested to be transmitted, and then outputs the processed data to the PHY unit 2315 in response to control by the control unit 2305. Here, the data includes information on a channel power management mode, an operating class, a channel number, and regulatory maximum transmit power.

The PHY unit 2315 performs forward error correction (FEC) encoding and modulation to data requested to be transmitted from the MAC unit 2320 that is a media access control (MAC) layer. Then, the PHY unit 2315 performs a process of adding signals such as a preamble and a pilot to the modulated signal so as to generate a frame and transmits the generated frame to the RF transmitting/receiving unit 2310.

The RF transmitting/receiving unit 2310 converts a frame inputted from the PHY unit 2315 that is a physical layer into an RF signal, and then transmits the converted frame via an antenna after filtering and amplifying the converted frame. Here, the frame transmitted via the antenna is the channel power management announcement frame 700.

The station 2350 may receive the channel power management announcement frame including channel information from the AP 2300.

That is, the RF transmitting/receiving unit 2360 converts the RF signal received via the antenna into a digital signal that can be processed in the PHY unit 2365 by performing a filtering operation.

The PHY unit 2365 performs demodulation, equalization, and FEC decoding to the frame received via the RF transmitting/receiving unit 2360, and performs a process of removing the added preamble and pilot to output a data bit. Thereafter, the PHY unit 2365 transmits the outputted data bit to the MAC unit 2370.

The MAC unit 2370 processes received data inputted from the PHY unit 2365 to transmit the processed data to an upper layer. Here, the data includes information on a channel power management mode, an operating class, a channel number, and regulatory maximum transmit power.

The control unit 2355 may control the MAC unit 2370, the PHY unit 2365, and the RF transmitting/receiving unit 2360 so as to obtain corresponding information from the channel power management announcement frame. That is, the control unit 2355 may identify information on power switch in a current channel by analyzing the received channel power management announcement frame. Further, the control unit 2355 may identify information on switch to a new channel and power switch in the new channel by analyzing the received channel power management announcement frame.

Further, the control unit 2305 or 2355 controls an operation for performing deenablement according to the second embodiment. In the present embodiment, the enabling STA may be configured with the same devices as the AP 2300, and the dependent STA may be configured with the same devices as the station 2350.

The control unit 2305 of the enabling STA 2300 may control an overall process of generating and signaling a frame including information on an operating class, a channel number, and deenablement. The control unit 2355 of the dependent STA 2350 may control an overall process of analyzing a frame received from the enabling STA 2300 and performing deenablement.

The enabling STA 2300 may recognize that a primary user is detected in an enablement-approved channel on the basis of an updated available channel list. Further, the enabling STA 2300 may receive a radio measurement report frame transmitted from the dependent STA 2350 to recognize that a primary user is detected in an enablement-approved channel. Here, the enabling STA 2300 generates the DSE extended deenablement frame 200 in order to perform deenablement for the corresponding channel.

That is, the control unit 2305 may control the MAC unit 2320 and the PHY unit 2315 so as to generate the DSE extended deenablement frame 2000. Here, the DSE extended deenablement frame 2000 generated by the control unit 2305 includes information on an operating class, a channel number, and a deenablement reason.

The MAC unit 2320 processes data transferred from an upper layer, i.e. the data requested to be transmitted, and then outputs the processed data to the PHY unit 2315 in response to control by the control unit 2305. Here, the data includes information on an address of a requesting station, an address of a responding station, an operating class, a channel number, and a deenablement reason.

The PHY unit 2315 performs forward error correction (FEC) encoding and modulation to data requested to be transmitted from the MAC unit 2320 that is a media access control (MAC) layer. Then, the PHY unit 2315 performs a process of adding signals such as a preamble and a pilot to the modulated signal so as to generate a frame and transmits the generated frame to the RF transmitting/receiving unit 2310.

The RF transmitting/receiving unit 2310 converts a frame inputted from the PHY unit 2315 that is a physical layer into an RF signal, and then transmits the converted frame via an antenna after filtering and amplifying the converted frame. Here, the frame transmitted via the antenna is the DSE extended deenablement frame.

The dependent STA 2350 may receive the DSE extended deenablement frame 2000 from the enabling STA 2300.

That is, the RF transmitting/receiving unit 2360 converts the RF signal received via the antenna into a digital signal that can be processed in the PHY unit 2365 by performing a filtering operation.

The PHY unit 2365 performs demodulation, equalization, and FEC decoding to the frame 2000 received via the RF transmitting/receiving unit 2360, and performs a process of removing the added preamble and pilot to output a data bit. Thereafter, the PHY unit 2365 transmits the outputted data bit to the MAC unit 2370.

The MAC unit 2370 processes received data inputted from the PHY unit 2365 to transmit the processed data to an upper layer. Here, the data includes information on an address of a requesting station, an address of a responding station, an operating class, a channel number, and a deenablement reason.

The control unit 2355 may control the MAC unit 2370, the PHY unit 2365, and the RF transmitting/receiving unit 2360 so as to obtain corresponding information from the DSE extended deenablement frame 2000.

That is, the control unit 2355 analyzes the requester STA address field of the DSE extended deenablement frame in order to confirm whether an address of a requesting station matches that of the enabling STA 2300. Further, the control unit 2355 analyzes the responder STA address field of the DSE extended deenablement frame in order to confirm whether an address of a responding station matches that of the control unit.

Further, the control unit 2355 analyzes the reason result code field of the DSE extended deenablement frame in order to confirm whether deenablement is performed for a specific channel or all channels.

According to a result of the confirmation, the control unit 2355 may perform deenablement for a specific channel or all channels.

At least a part of the methods according to the embodiments may be implemented as a program to be executed in a computer and may be stored in a computer-readable recording medium. The computer-readable recording medium includes a ROM, a RAM, a CD-ROM, a magnetic tape, a floppy disk, and an optical data storage device. Further, the methods may also be implemented as a form of a carrier wave (for example, transmission via the Internet).

The computer-readable recording medium may be distributed to computer systems connected to a network so that computer-readable codes may be stored and executed in a distribution manner. Further, a function program, a code, and code segments for implementing the methods may be easily derived by programmers skilled in the technical field to which the present invention belongs.

Although embodiments have been described with reference to a number of illustrative embodiments thereof, numerous other modifications can be devised without departing from the scope of the present disclosure. Therefore, the scope of the present disclosure is not limited to the described embodiments but should be determined by the following claims and their equivalents.

That is, the above detailed description shows an example applied to a wireless LAN system using the TV white space. However, the present disclosure can also be applied to other wireless communication systems using the TV white space by those skilled in the art without departing the scope of the present disclosure.

What is claimed is:

1. A first station for providing channel information in a wireless local area network system, the first station comprising:

a controller configured to prepare a frame including at least one triplet, wherein the triplet includes an operating class field, a channel number field, and a maximum transmit power field, wherein the operating class field and the channel number field together specify at least one channel on which a second station is allowed to operate based on a maximum allowable transmission power indicated by the maximum transmit power field, and wherein the operating class field indicates at least a channel set; and a transceiver connected to the controller and configured to transmit the frame to the second station.

2. The first station of claim 1, wherein the controller is configured to control the first station operates as an enabling station in the wireless local area network system.

3. The first station of claim 1, wherein the controller controls the transceiver to transmit the frame in response to a reception of a request frame from the second station.

4. The first station of claim 1, wherein the controller prepares each of the operating class field, the channel number field, and the maximum transmit power field to have one octet length, respectively.

5. The method of claim 1, wherein the first station and the second station operate in a TV white space band.

* * * * *